US008677065B1

(12) United States Patent
Cousins

(10) Patent No.: US 8,677,065 B1
(45) Date of Patent: *Mar. 18, 2014

(54) TRANSACTION-BASED STORAGE SYSTEM AND METHOD THAT USES VARIABLE SIZED OBJECTS TO STORE DATA

(76) Inventor: Robert E. Cousins, Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/079,014

(22) Filed: Apr. 3, 2011

Related U.S. Application Data

(63) Continuation of application No. 12/573,883, filed on Oct. 6, 2009, now Pat. No. 7,937,528, which is a continuation of application No. 12/039,698, filed on Feb. 28, 2008, now Pat. No. 7,600,075, which is a continuation of application No. 10/845,546, filed on May 13, 2004, now Pat. No. 7,386,663.

(51) Int. Cl.
*G06F 12/00* (2006.01)
(52) U.S. Cl.
USPC .................... 711/114; 711/159; 711/E12.007
(58) Field of Classification Search
USPC ................................................. 711/114, 159
See application file for complete search history.

(56) References Cited

U.S. PATENT DOCUMENTS

| | | | |
|---|---|---|---|
| 5,233,616 A | 8/1993 | Callander | |
| 5,357,475 A | 10/1994 | Hasburn et al. | |
| 5,630,104 A | 5/1997 | Ottesen et al. | |
| 5,933,834 A | 8/1999 | Aichelen | |
| 5,974,424 A | 10/1999 | Schmuck et al. | |
| 6,119,118 A | 9/2000 | Kain et al. | |
| 6,230,312 B1 | 5/2001 | Hunt | |
| 6,571,351 B1 | 5/2003 | Mitaru et al. | |
| 6,671,772 B1 | 12/2003 | Cousins | |
| 6,742,137 B1 * | 5/2004 | Frey, Jr. | 714/6.22 |
| 6,871,272 B2 | 3/2005 | Butterworth | |
| 2002/0087823 A1 | 7/2002 | Chow et al. | |
| 2002/0103815 A1 | 8/2002 | Duvillier et al. | |
| 2003/0131173 A1 | 7/2003 | Cassidy et al. | |
| 2004/0054858 A1 | 3/2004 | Chandrasekaran et al. | |
| 2004/0193719 A1 | 9/2004 | Yang et al. | |
| 2004/0205387 A1 | 10/2004 | Kleiman et al. | |
| 2005/0021713 A1 | 1/2005 | Dugan et al. | |
| 2005/0114596 A1 | 5/2005 | Golding | |

OTHER PUBLICATIONS

"File System Implementation", http://www.isi.edu/~faber/cs402/notes/lecture20.pdf, Apr. 21, 2003.

(Continued)

*Primary Examiner* — Reginald Bragdon
*Assistant Examiner* — Aracelis Ruiz
(74) *Attorney, Agent, or Firm* — DLA Piper LLP (US)

(57) ABSTRACT

Aspects of the innovations herein are consistent with a storage system for storing variable sized objects. The storage system may be a transaction-based system that uses variable sized objects to store data. The storage system may be implemented using arrays disks that are arranged in ranks. Each rank may include multiple stripes. Each stripe may be read and written as a convenient unit for maximum performance. A rank manager may be provided to dynamically configure the ranks to adjust for failed and added disks by selectively shortening and lengthening the stripes. The storage system may include a stripe space table that contains entries describing the amount of space used in each stripe. An object map may provide entries for each object in the storage system describing the location (e.g., rank, stripe and offset values), the length and version of the object.

20 Claims, 13 Drawing Sheets

(56) References Cited

OTHER PUBLICATIONS

Nievergelt, J., "Binary Search Trees and File Organization", Sep. 1974, Computing Surveys, vol. 6, No. 3.

Fagin, Harold, et al., "Extendible Hashing—A Fast Access Method for Dynamic Files," Sep. 1979, ACM Transactions on Database Systems, vol. 4, pp. 315-344.

Custer, Helen, "Inside the Windows NT File System," Jun. 1994, Microsoft Press, pp. 24-27.

Memon, Jai, "A Performance Comparison of RAID-5 and Log-Structured Arrays", Aug. 1995, Proceedings of the Fourth IEEE International Symposium on High Performance Distributed Computing, pp. 167-178.

* cited by examiner

PHYSICAL CONNECTIONS

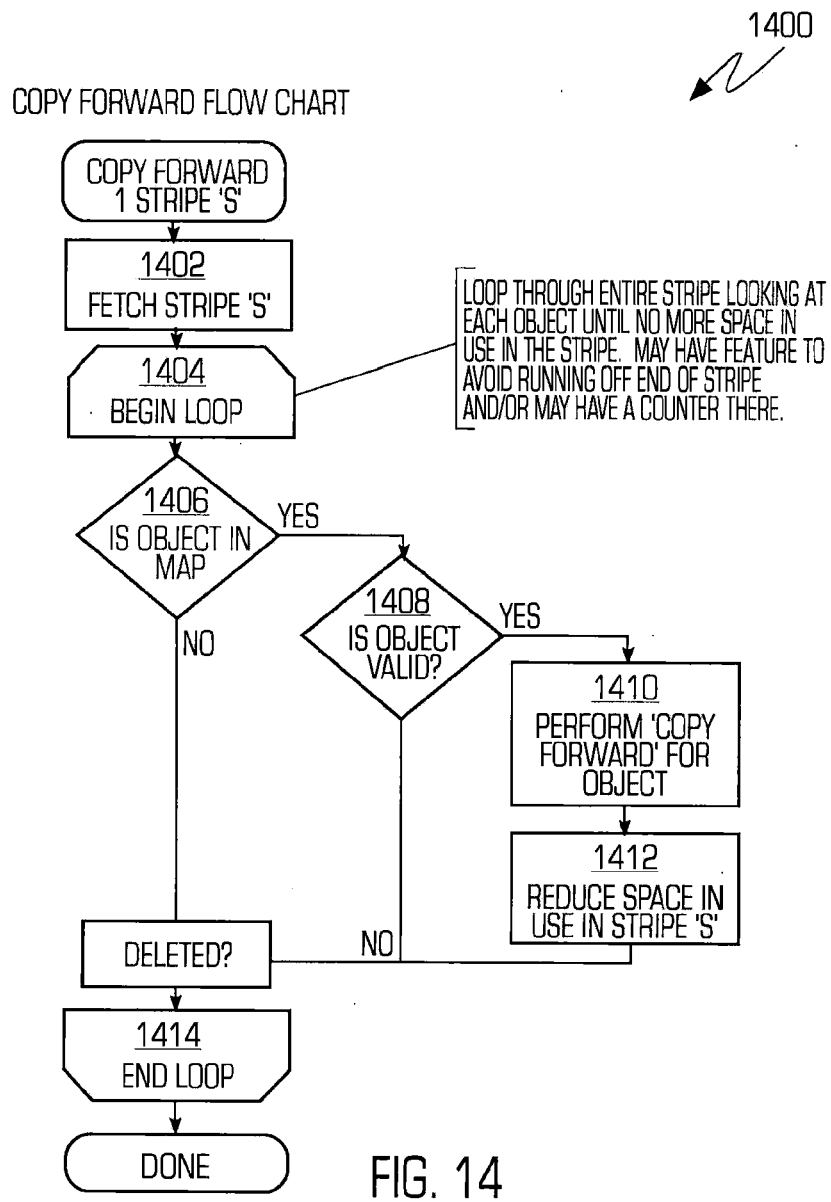

TRANSACTION-BASED STORAGE SYSTEM AND METHOD THAT USES VARIABLE SIZED OBJECTS TO STORE DATA

CROSS REFERENCE TO RELATED APPLICATION(S)

This is a continuation of application Ser. No. 12/573,883, filed Oct. 6, 2009, published as US2010/0205231A1, now U.S. Pat. No. 7,937,528, which is a continuation of application Ser. No. 12/039,698, filed Feb. 28, 2008, published as US2008/0263089A1, now U.S. Pat. No. 7,600,075, which is a continuation of application Ser. No. 10/845,546, filed May 13, 2004, published as US2005/0257083A1, now U.S. Pat. No. 7,386,663, which are incorporated herein by reference in entirety.

BACKGROUND

1. Field

The present invention generally relates to storage technology and more particularly to a transaction-based storage system and method for managing file and block data, which uses variable sized objects to store data.

2. Description of Related Information

Historically, computer storage has followed an approach as shown generally in FIG. 1. Physically, a computer 10 contains a disk controller 20—a piece of hardware which provides an electrical connection to a disk. Normally, the disk controller 20 is a chip or card in the system. The controller is electrically connected to one or more disk drives 30 which are used to store and retrieve data.

RAID (redundant array of independent disks) is a way of storing the same data in different places (thus, redundantly) on multiple disks. By placing data on multiple disks, I/O operations can overlap in a balanced way, improving performance. Since multiple disks increase the mean time between failure (MTBF), storing data redundantly also increases fault-tolerance. A RAID appears to the operating system of the computer to be a single logical hard disk. As discussed below in greater detail, RAID employs the technique of striping, which involves partitioning each drive's storage space into units of varying size. The stripes of all the disks are typically interleaved and addressed in order. Some important abstractions are associated with RAID. (These functions are sometimes implemented in hardware—in the controllers, in software in the volume managers or in out-of-the-box devices which pretend to be very large disks to the disk controller.) The following discussion covers some of the more relevant types of RAID.

RAID 0 is actually a fairly old technique. It was originally known as striping. It operates by taking several identical disks and remapping the logical disk addresses such that sequential transfers follow the following pattern: On the first disk, read all sectors from a cylinder (track by track). Next read all sectors from the corresponding cylinder on the second disk. Repeat this until all disks are visited. (This is called a stripe.) Then seek to the next cylinder on the first disk and repeat. (The actual definition of stripe varies in detail from implementation to implementation. However, the key point is that a stripe contains data components which, when written or read involve all data disks.)

RAID 1 was originally known as mirroring. In this technique, two (or more) identical disks are kept as exact duplicates. Read operations can be dispatched to any available disk. This makes read operations run faster when there are enough outstanding requests to keep all of the disks busy. Write operations must write on all disks which makes write operations somewhat slower than the single disk scenario. However, most modern disk subsystems have enough buffering to minimize this penalty. Sequential reads are really no faster than a single disk. Sequential writes have analogous overhead since all disks must be updated at once.

RAID 4 is a technique applied to arrays with 3 or more identical disks. One disk is designated the parity disk and the remainder are data disks. In essence, the data disks are arranged in a RAID 0 configuration. As a result, read operations have similar performance characteristics as a RAID 0 configuration with n−1 disks. However, the parity disk contains redundant information—information which is "extra" and allows the contents of one of the other drives to be deduced in case of failure. Updating the data disks requires updating the parity disk so that at any time any one disk can be lost and have the RAID 4 continue to operate (at a degraded level) without loss of data.

Parity is a binary operation calculated through the use of XOR operations. In essence it is a count of whether the total number of '1' bits is even or odd. In the case of RAID 4, the parity is calculated across the disks. For example, the parity disk's sector 0 is the parity calculated from the data disks' sector 0. The parity is calculated by taking the first bit in sector 0 on each data disk, XORing the bits together. The result is the first bit in the parity disk's sector 0. This process is repeated for each bit in the sector. A 512 byte sector contains 4096 bits which could consume quite a bit of time. However, modern 64-bit CPUs can typically perform the calculation on 64 bits at a time reducing the effort to perform the parity calculations dramatically. FIG. 2 is a chart showing representative CPU clock counts for parity calculations for various widths of RAID 4 implementations using a Pentium III (and not well optimized code).

If a disk drive in a RAID 4 fails for any reason, the parity information makes it possible to calculate the contents of the failed disk. For example, assume that the host wishes to access a particular sector in the array which happens to map to a drive which has failed. The RAID 4 subsystem would instead read the corresponding sectors in all of the other disks and calculate the parity of these sectors. The result of the parity calculation is the original contents of the data in the failed disk. This technique can be used either online—to allow the RAID 4 to continue to operate in the face of a failure or offline—to rebuild the contents of the lost disk into a fresh new disk installed into the array. (Most arrays can continue to operate online but some must go offline to rebuild a new disk once it is available.)

Some advantages of RAID 4 include: Reliability—RAID 4 can survive the complete failure of any one of its component disks. Space Efficiency—RAID 4 consumes only 1/n of the storage for redundant storage which is less than mirroring. Common implementations will set n to values in the 3 to 8 range so the corresponding savings in space can be large and the cost savings important. Expandability—RAID 4 arrays can be expanded the same way RAID 0s can be expanded. In fact, if the new disk is already initialized to all 0's, it can be inserted without revisiting the parity information. Sequential Read performance—RAID 4 can provide sequential bandwidth proportional to n−1 times the throughput of a single disk. For some classes of applications (such as streaming media) this can be extremely valuable.

Some disadvantages of RAID 4 include: Slow Writes—The RAID write bottleneck is a huge problem for most environments. A RAID 4 can process on the order of ½ the number of small write operations per unit time as a single disk. For a RAID 4 built from 5400 RPM disks, this translates into a peak of approximately 45 write operations per second. Added complexity compared to RAID 0 or RAID 1. Requires all disks to be identical size.

RAID 5 is a seemingly small modification to RAID 4 but it completely changes the result. Where RAID 4 has a dedicated parity disk, RAID 5 uses a "distributed" parity approach. RAID 5 decides to abandon the dedicated parity disk and instead to spread the parity information throughout all n disks. For example, the parity information for the first stripe could be on drive 0, the second stripe on drive 1, etc. The most common pattern is a 'barber pole' whereby the parity for each stripe moves to a higher disk drive from the previous stripe.

RAID 10 is really RAID 1+RAID 0. It is simply a RAID 0 created out of mirrored disks (or if you prefer, a mirrored RAID 0). This approach is used where maximum reliability and throughput are required and cost is not a concern. However, RAID 10 cannot survive the loss of any 2 disks so it is actually not much more reliable than RAID 4 or RAID 5. But, RAID 10 does not have the same write bottleneck as RAID 4 or RAID 5 but wastes 50% of its disk storage.

RAID 41 or Mirrored RAID 4s is extremely uncommon, but is relevant to the present discussion. In essence, it is a RAID 4 created out of mirrored disks. The result is extremely robust at the cost of storage efficiency. RAID 41 can survive multiple disk failures. In fact, under some circumstances it can loose more than 50% of the disks and still operate without loss of data. In most configurations, a RAID 41 can recover from the loss of at least any 2 disks and often more. Some drawbacks to RAID 41 are: it requires lots of disks (minimum 6), and low space utilization. The space efficiency of RAID 41 will never achieve 50%. RAID 41 has similar performance characteristics to RAID 4.

ECC technology is used within disks to determine and correct read errors. The common ECC technology used today is derived from Reed-Solomon codes. There is a little known variant of these error correcting codes known as erasure codes, or REED-Solomon Erasure Code-based RAID (RS-RAID). These codes do not have the ability to detect an error; they simply recover the error once it is detected. In essence, they recover "erased" data. The value of these codes is that one can create a RAID-like array which contains n data disks and m "parity" disks. This array can survive the failure of any combination of m disks.

FIG. 3 provides a graph showing the overall storage efficiency for different RAID configurations over a reasonable range of array sizes. This section provides some explanation of this graph. RAID 0 has no overhead so it is always 100% efficient. RAID 1 mirrors the same data on more and more disks so its efficiency goes down as more disks are added. RAID 4 and RAID 5 have a single parity disk's worth of overhead so this grows proportionally smaller as the number of disks is increased. RAID 10 requires an even number of disks so odd disks are assumed to be spares (hence the "zig-zag"). RAID 41 similarly requires even numbers of disks so odd disks are considered spares. RS-RAID can have any number of parity disks, and is plotted with m=3 so that the RS-RAID configuration can survive 3 failures. If m were set equal to 1, the curve would have been the same as RAID 4/5.

In view of the foregoing, it would be desirable to provide a file system using a RAID configuration with large numbers of disks (for storage efficiency) while writing stripes (to avoid the parity bottleneck) and which can grok (i.e., adapt to) the addition of disks to the end of the stripe (for easy expansion). The file system would be able to provide the following features: very high write speeds; very high parallel read speeds; selectably high reliability; easy expansion (one disk at a time if desired); high capacity (lots of disks add up quickly); and excellent storage utilization.

File System Operations

File systems provide an important abstraction layer. They convert raw sectors into files and directories (or "folders"). The functionality, performance and limitations of a given file system are the product of the underlying design of the file system.

1. Traditional Block Oriented File Systems

Early file systems were designed to run on relatively small machines, often with as little as 4K of memory. Their file services were necessarily limited and the file system designs placed simplicity and reliability at a premium. Furthermore, early disk drives were typically only a handful of megabytes so scalability was often unimportant.

One of the early simplifying concepts was the use of blocks of storage instead of sectors. A block is the smallest unit of storage managed by the file system. In some cases a block is a sector but in most cases a block is a power of 2 sectors. Some file systems use blocks as large as 128 sectors (64K). Almost no file system uses blocks smaller than a sector due to the complexity of blocking/deblocking contents into sectors. The most common block size is 8K with 4K and 16K being less popular. Typically, file systems would implement an internal abstraction of a volume as a collection of blocks numbered from 0 to m−1 covering the entire volume.

2. Journaling File Systems

Journaling is actually a very simple concept. As file system modifications are fed into the buffer cache, the file system builds a journal of the changes. This journal is effectively a recipe for changing the file system from its current state to the proper state with the changes made. As the system has time and available disk bandwidth, it can execute the journal keeping the disk more-or-less up to date. If the write load becomes too heavy, the journal grows faster than it can be retired. During relative lulls in activity, the journal shrinks until it is empty.

A number of optimizations are possible in the journaling file system design. It is possible to optimize a journal by suppressing redundant writes—only the last write to a given location need be executed. It is possible to order writes such that a volume is up to date after a single pass through the disk—dramatically decreasing seek times. Some journaling implementations only journal metadata changes, while others journal everything.

3. Transaction Logging File Systems

Transaction logging file systems (TLFS) are based upon a different approach to file management. However, for motivation, a TLFS can be viewed as a journaling file system with a huge journal which never gets around to updating the block file system. The classic TLFS is LFS in the Sprite operating system.

It would be desirable to provide a TLFS that has the following features:

Dynamic expansion—the ability to add storage to the file system at any time without complex preparation or even bringing the file system off line.

High speed writes—the ability to optimize writes to be 100% sequential and stripe-sized so as to tap the full write bandwidth of an RS-RAID array.

Undeletion or versioning of files—the ability to "go back in time" to a previous state in the file.

Self-healing—The ability to isolate failed disks and recover to the degree that little performance is lost and that additional disk failures can be endured under similar conditions.

The present invention provides such a file system by use of generalized object storage technology.

SUMMARY

The present invention provides a storage system for storing variable sized objects. The storage system is preferably a transaction-based system that uses variable sized objects to store data. The storage system is preferably implemented using arrays disks that are arranged in ranks. Each rank includes multiple stripes. Each stripe may be read and written as a convenient unit for maximum performance. A rank manager is able to dynamically configure the ranks to adjust for failed and added disks by selectively shortening and lengthening the stripes. The storage system may include a stripe space table that contains entries describing the amount of space used in each stripe. An object map provides entries for each object in the storage system describing the location (e.g., rank, stripe and offset values), the length and version of the object. A volume index translates regions of logical storage into object identifiers. The storage system may implement various types of formats such as I-node, binary tree and extendible hashing formats.

According to one aspect of the invention, a storage system is provided and includes a file system that uses variable sized objects to store data. The file system may be implemented using: a plurality of ranks, each of the ranks including an array of disks configured to provide a plurality of stripes for storing objects, and may be adapted to write each stripe of data into the plurality of ranks as a unit.

According to another aspect of the present invention, a storage system is provided and includes a file system that is adapted to store variable sized objects. The file system is implemented using: a plurality of ranks, each of the ranks including an array of disks configured to provide a plurality of stripes for storing objects; and a rank manager that is adapted to reconfigure ranks to adjust for failed disks and added disks by selectively shortening and lengthening the stripes in the ranks.

These and other features and advantages of the invention will become apparent by reference to the following specification and by reference to the following drawings.

BRIEF DESCRIPTION OF THE DRAWINGS

FIG. 14 is a flow chart illustrating the methodology of a copy forward operation in the file system.

FIG. 15 is a conceptual diagram of an example of a volume index used of the file system.

DETAILED DESCRIPTION OF EXEMPLARY IMPLEMENTATIONS

Figure 1:
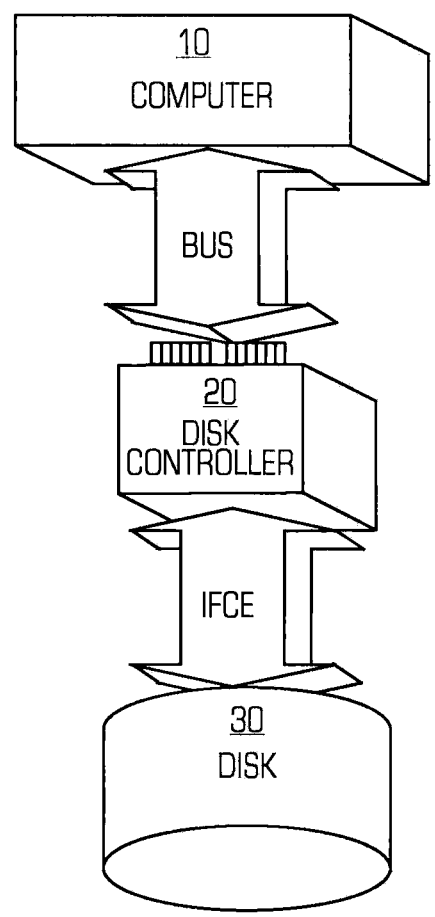
FIG. 1 is a block diagram illustrating a computer system including disk storage, according to the prior art.
Figure 2:
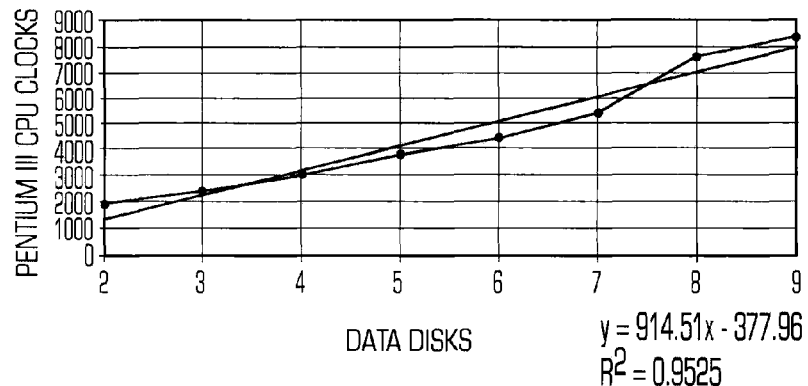
FIG. 2 is a chart showing representative CPU clock counts for parity calculations for various widths of RAID 4 implementations using a Pentium III™ processor, according to the prior art.
Figure 3:
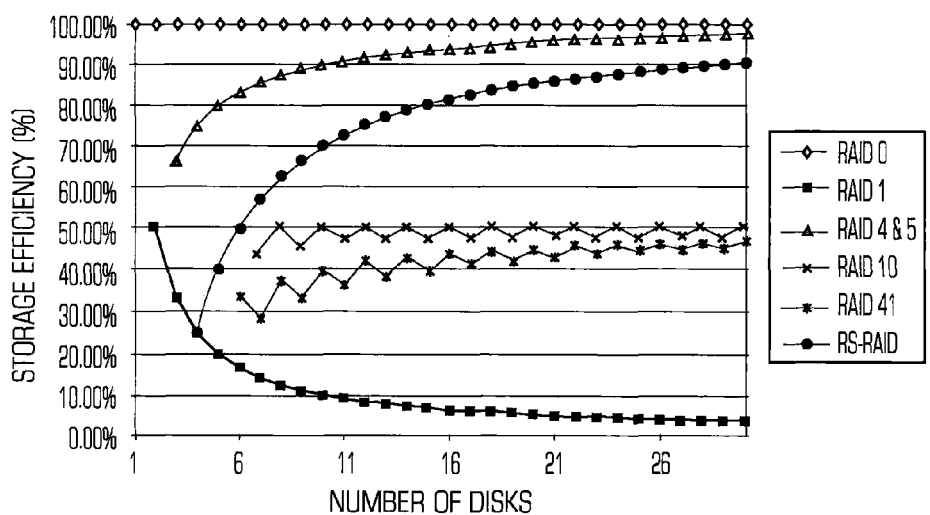
FIG. 3 is a graph showing the overall storage efficiency for different RAID configurations over a reasonable range of array sizes.

The present invention will now be described in detail with reference to the drawings, which are provided as illustrative examples of the invention so as to enable those skilled in the art to practice the invention. Notably, the implementation of certain elements of the present invention can be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

I. A Generalized Object Storage Facility

The present invention is based upon a system which can store variable sized objects. In one embodiment, these objects are conceptually relatively small—for example, 64 to 64K bytes (subject to an implementational limit and a size defined in granules—the smallest amount of allowable storage and alignment). Each object has a unique identifier, an OID, which can be used to fetch or store that object. Objects may have multiple instances. Any legal object has a current instance and potentially several older instances which were once current. Eventually, the system has copies of instances which are no longer needed. These are called obsolete. Throughout the life of the object, it can grow and shrink as desired without any negative impact. In other words, there is no requirement for an object to maintain its size from instance to instance. This provides huge amounts of flexibility for providing higher level services.

The object storage model is implemented using a transaction logging system. This results in high write speeds, large and scalable storage along with high reliability. A few interesting features include the fact that unreferenced objects can be mapped to null—consuming no actual storage. This makes sparse SAN volumes and sparse files easy and efficient. Another point is that multiple versions of the volume or file system can be stored using the multiple object instance technology. This makes checkpointing or "point in time backup" trivial and space efficient. Furthermore, multiple volumes and file systems can share the same pool of storage for greater convenience and utility. Storage can be added to the pool at any time—and the pool can be underprovisioned.

Using the object storage model, it is possible to build higher level functionality. For applications which need a large "virtual disk" such as SANs, it is straightforward to create a "disk" out of an array of objects. The resulting volume will have a number of powerful features which do not exist in normal disks but will still be 100% compatible with existing software.

For applications which need a large file system, the object model can create a powerfully general and scalable file system. Instead of using blocks, the system is able to use objects which change size throughout their life. The result is a huge boost in flexibility and simplicity.

II. General System Architecture

The following section describes examples of preferred implementations of the present invention in a computer system. It should be appreciated that the foregoing examples are not the only ways in which the file system of the present invention could be implemented.

Figure 5:
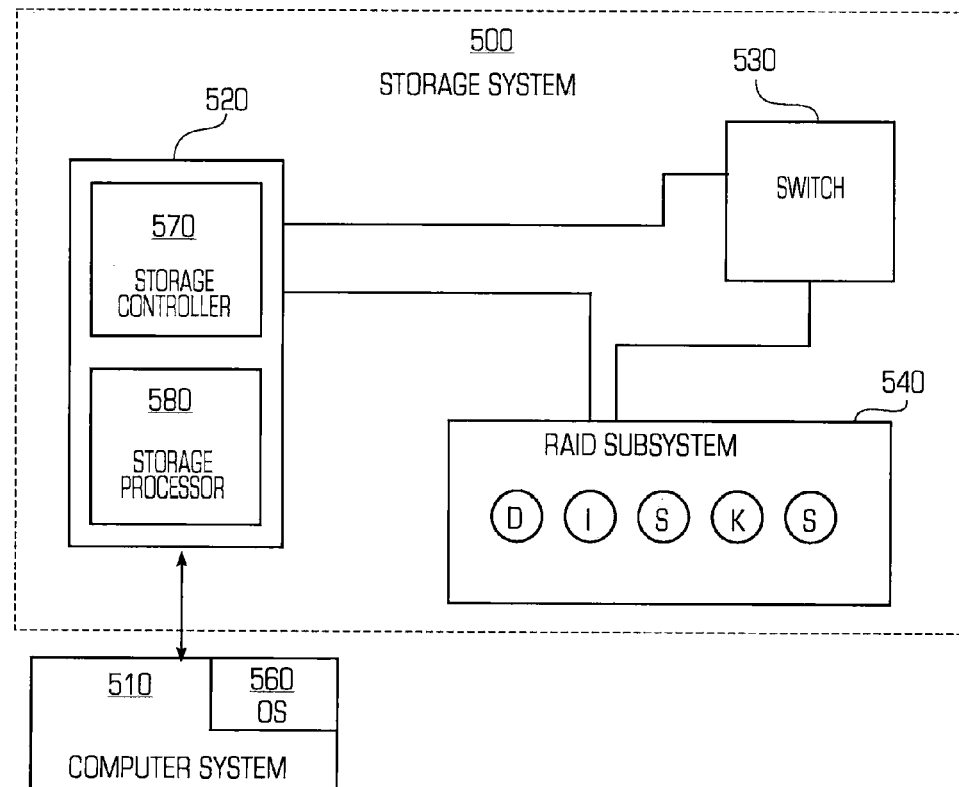
FIG. 5 is a block diagram illustrating a computerized storage system, which may incorporate the present invention.

FIG. 5 illustrates a computerized storage system 500, which may incorporate the present invention. The storage system 500 may be communicatively coupled to a conventional computer system 510 in a conventional manner, and may include a peripheral controller, a SAN switch 530 and a RAID subsystem 540 including a plurality of disks. The present invention may be implemented in one or more of the various components of the storage system 500 and/or computer system 510, which are described below.

A. Operating System Module

In one embodiment, the file system of the present invention may be implemented as a module in the operating system 560 of computer system 510. The operating system 560 may be a conventional, existing operating system such as Windows/XP, Linux, FreeBSD or Solaris. These operating systems have built-in support for multiple types of file systems, so the file system functionality could be incorporated directly. The existing file systems could be mapped to use the block storage facilities as an option through the volume management facility. Block-oriented applications such as Oracle™ (and other DBMS products) would be able to take advantage of the checkpoint, compression and under-provisioning features discussed below without modification.

Such a module would have the potential of using detailed knowledge of the file systems to determine when blocks (objects) are no longer required. This would result in better storage efficiency and improved functionality. Furthermore, the file systems could be modified to use the file system facilities more directly resulting in additional operational efficiencies.

B. Peripheral Controller

In another embodiment, the file system of the present invention may be implemented in a conventional intelligent peripheral controller 520. One example using contemporary technology would be to build a printed circuit card with a PCI interface on it. Internally the card would contain a small, independent computer 570 with facilities to talk to disk storage (perhaps SATA, SCSI, iSCSI or FibreChannel). This storage method would be implemented as a program which runs on this dedicated computer. The host computer 510 would have three classes of interaction with the peripheral:

1. Administrative—to deal with changes, log errors, monitor status, etc.
2. Block-level functions—similar to a disk controller or SAN interface and
3. File-level functions—essentially 'v-node' type operations (to borrow a term from UNIX architecture).

This approach has a number of advantages:

It is host independent. There is little dependency on the host's architecture and operating system. The same (or very similar) card and software could be used in a Windows/XP machine or in a Linux machine. (This also reduces research and development and quality assurance costs.)

It is resilient. If the host crashes or is reset, the coprocessor need not be effected.

Good resource availability. Coprocessors 580 may be incorporated and have exactly the resources required for the task. Unlike the OS module approach, the coprocessor has its own compute and memory resources which can be scaled independently of the host.

More easily upgraded. Operating system modules are inherently closely tied to the OS release (and patch level). The coprocessor 580 approach makes updating the firmware essentially OS-independent.

Finally, there is a variation of this approach which may have even greater value (i.e., the use of collaborating coprocessors 580). In this configuration, a number of hosts would each have one or more coprocessors in each of them. The coprocessors 580 would be interconnected by some scheme (perhaps 10-gig Ethernet). Most (but not necessarily all) coprocessors would have some attached storage. (It is also possible that some coprocessors would not be in hosts at all but would be 'free standing.') The coprocessors 580 would coordinate and share the management of the storage pool. Each host would be able to have private (unshared) block volumes. However, the actual storage for these volumes may be disbursed across several coprocessors. Furthermore, each host could have access to one or more private file systems (using globally shared storage). Finally, there could be some number of globally shared file systems built from globally shared storage. These file systems would appear to be local to the hosts but would be global. Unlike NFS or CIFS file system sharing, there would be no difference in semantics, nor the overhead associated with these protocols. Furthermore, the view of the file system from all hosts would be fully coherent and highly scalable. Freestanding nodes could provide access to additional storage, more caching and compute capability—an ideal way to expand an existing storage pool.

Implementation of this distributed architecture would be relatively simple. The object mapping table (discussed below) would be a distributed data structure with each node responsible for a portion of the map. Nodes interested in a given object would then "check out" the objects (a locking scheme). Unshared disk volumes would require no additional overhead. Shared file systems would find object-level sharing easy and efficient.

Each node would manage its own copy forward and stripe write/compression operations (discussed below). However, when deciding to copy an object forward, it will be possible to migrate the object to a less-loaded node. (Note: There is no requirement that all nodes have disks or even use disk technology. In principle, seldom-used objects could migrate to optical disk, tape or any other type of storage. This applies to all implementations, not just the distributed one.)

C. SAN Switch

In another embodiment, the file system of the present invention could be implemented within a convention SAN switch 530 which may be communicatively coupled to the peripheral controller 520 and the RAID system 540. Modern SAN switches provide a degree of virtualization in the form of virtualized volumes. By reasonable extension, the block-level services of this technology could be provided in a SAN switch. The result would be that existing SAN-based block storage (such as RAID arrays, JBODs, and the like) would take on the features of this storage technology yet would appear to be block volumes to various hosts connected to the switch.

In this embodiment, the entire system may reside within a SAN switch (which could optionally export file system functionality via NAS protocols). The backing storage could be managed via the object facility and the clients would "see" low voltage differentials (LVDs) created from backing storage.

A recent trend has been to add file systems to SAN switches to produce NAS head functionality. Once the technology of the present invention is installed in a SAN switch, the file system functionality is also available which would make incorporating it into some form of NAS functionality. A degenerate case of this would be a stand-alone NAS head.

D. Raid Subsystem/Controller

In another embodiment, the file system of the present invention may be implemented within a conventional and commercially available RAID subsystem and/or controller 540. Some of these devices plug directly into the host's bus. Others talk SCSI or FibreChannel. These intelligent controllers can adopt the present technology to provide improved block-level services. The result would be a dramatic lowering of the entry-level cost, boosting of peak write speeds, increased reliability and ability to recover from failures. Furthermore, operational costs (total cost of ownership) would be dramatically reduced.

III. Basic Disk Management

A. Ranks of Disks

Figure 6:
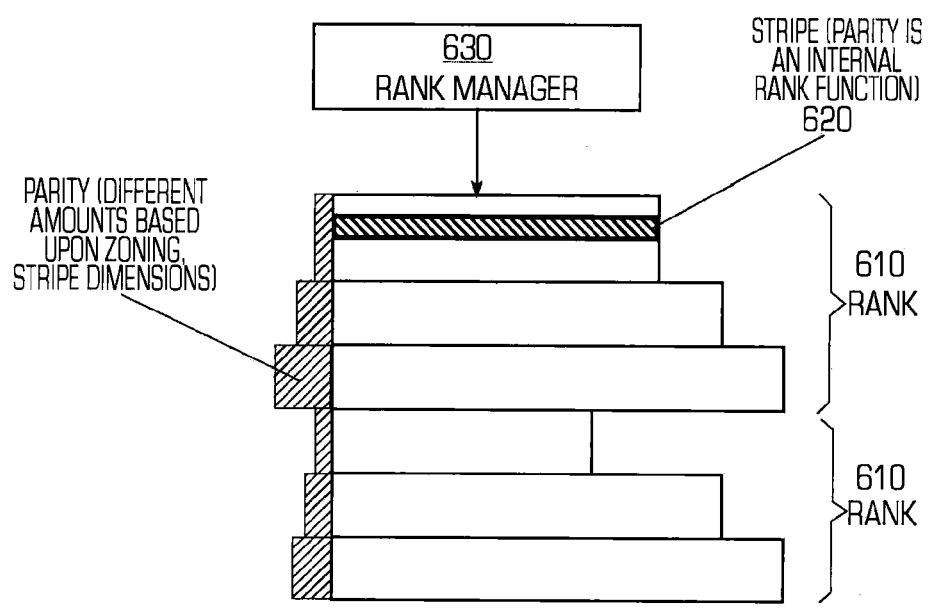
FIG. 6 is a schematic diagram of a storage system including several ranks configured according to the present invention.

The basic structure of storage is the disk drive. The present invention collects disk drives into groups called ranks. In one embodiment, a rank of disks can be viewed as a RAID 4 style RS-RAID (with some subtle changes), but as can be seen later, it could be implemented in a number of other ways. FIG. 6 illustrates a schematic view of a storage system 600 including several ranks 610 configured according to the present invention. A rank manager 630 controls the configurations of the ranks and can reconfigure the ranks when disks are added and/or dropped from the system. The rank manager 630 may include conventional hardware and software components.

The basic approach of the present invention is to abandon traditional logical addresses and to adopt a different scheme. This scheme uses stripe numbers and offsets within the stripe. One advantage of this approach is that a rank using this technique can have its stripes lengthened without needing to reorganize the data. For our purposes, a stripe 620 is defined as a convenient unit which can be written or read across the rank in a unit with maximum performance. Each rank 610 has a number of stripes 620. The stripes 620 have various sizes based upon the geometry of the disks (or other internal considerations). One very useful implication of this is that the disks in a rank no longer have to be identical. One advantage of this approach is that a rank using this technique can have its stripes lengthened without needing to reorganize the data. This allows one or more additional disks may be added to an array without the requirement for redundancy changes, or conversion of a redundant drive to a data drive (at the loss of some reliability).

In the preferred embodiment, ranks 610 are able to handle writes of entire stripes 620 cleanly and efficiently. Ranks 610 are also preferably able to read entire stripes 620 or any subset of the stripe 620. The ability to read pieces of a stripe would be handled by translating the required rank and stripe numbers and then calculating which disk(s) need to be read and the location(s) involved. Then the required sector(s) would be fetched from the drive(s)—probably concurrently for performance but not strictly required. A "stripe read" is simply a request for the entire stripe. Furthermore, each rank 610 is preferably adapted to notice when one of its disks is failing or failed. A rank 610 can be ordered to reconfigure itself omitting the failed disk. A rank can also be ordered to reconfigure itself with a new disk. When a rank reconfigures itself, it provides a description of its stripes (count and sizes).

Figure 7:
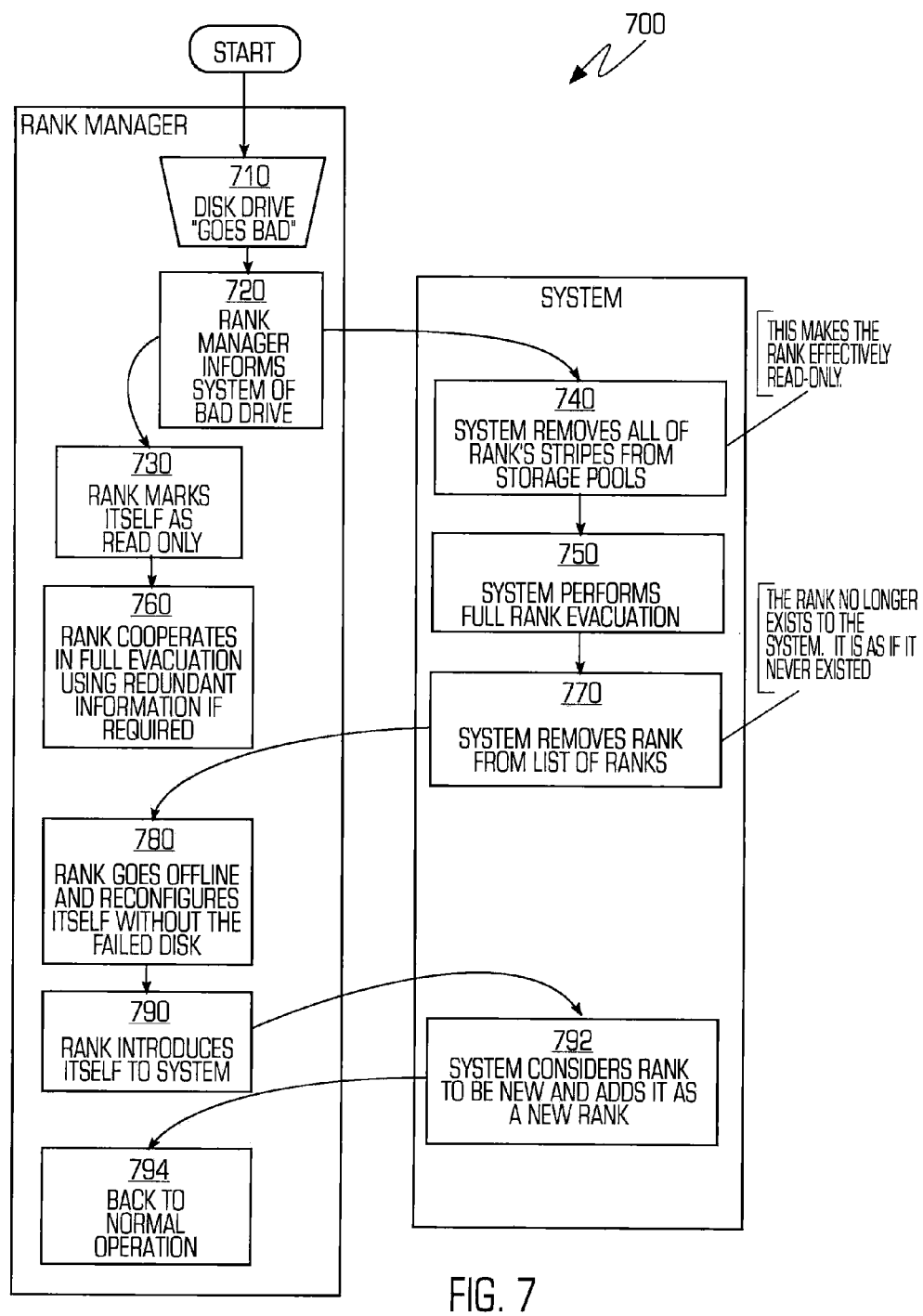
FIG. 7 is a flow diagram illustrating the operation of the system and rank manager reconfiguring ranks to account for a single disk failure.
Figure 8:
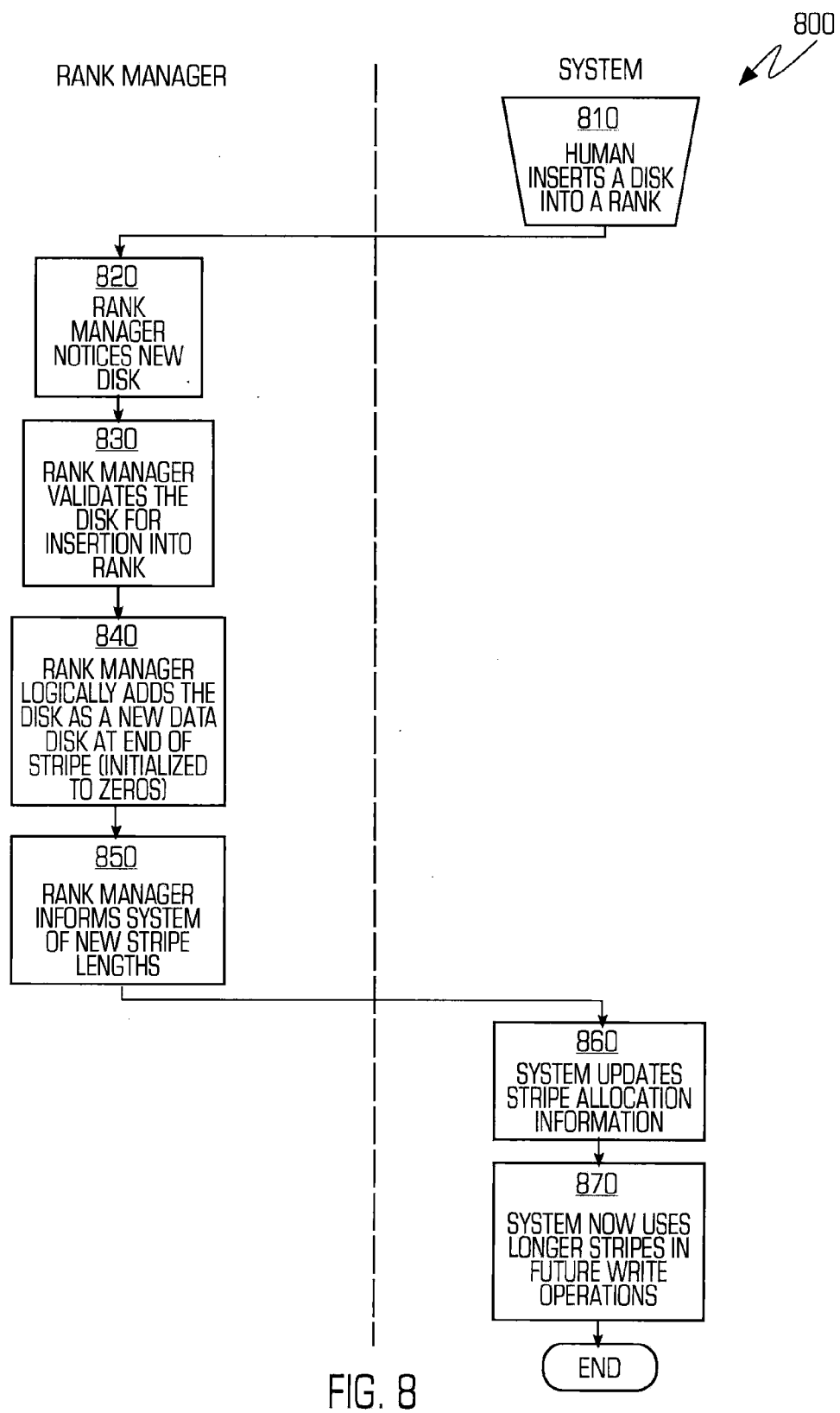
FIG. 8 is a flow diagram illustrating the operation of the system and rank manager reconfiguring ranks to account for a new disk.
Figure 9:
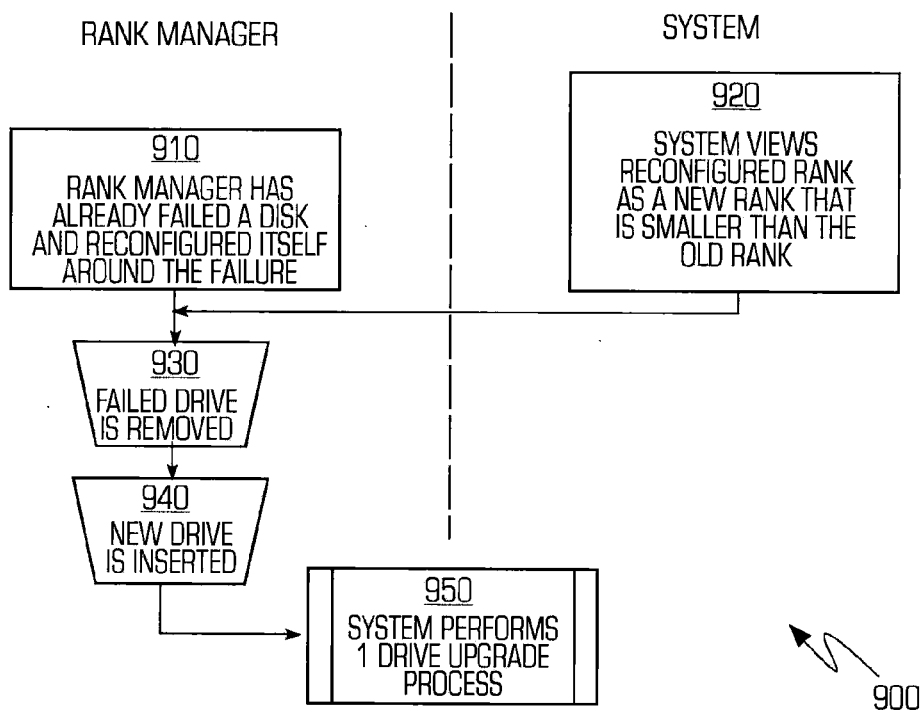
FIG. 9 is a flow diagram illustrating the operation of the system and rank manager reconfiguring ranks to replace a new disk.

FIGS. 7, 8 and 9 illustrate the operation of the system and rank manager to reconfigure ranks to account for different situations. FIG. 7 illustrates a method 700 that the system and rank manager may use to reconfigure ranks to account for a single disk failure. In step 710, the rank manager detects a malfunctioning disk drive. In step 720, the rank manager 630 informs the system of the malfunctioning drive and its associated rank and location. In step 730, the rank marks itself as read only. Concurrently, the system removes all of the rank's stripes from storage pools, in step 740. In step 750, the rank cooperates in evacuating information to another storage location. The rank cooperates in this evacuation using redundant information if required, as shown in step 760. Once the rank has been evacuated, the system removes the rank from its list of ranks so that the rank no longer exists to the system, as shown in step 770. Once the rank is offline, it reconfigures itself without the failed disk (e.g., with shortened stripes), as shown in step 780. In step 790, the rank notifies the system that it is available for use. In step 792, the system considers the rank to be a new rank and adds it as a new rank. The system adds all of the rank's stripes to its storage pools. In step 794, the system and rank resume normal operation.

FIG. 8 illustrates a method 800 that the system and rank manager may use to reconfigure ranks to account for a new disk. In step 810, a new disk is inserted into a rank (e.g., by a human operator or technician). In step 820, the rank manager detects the new disk. In step 830, the rank manager validates the new disk for insertion into a rank. The validation may include validating any private data and making sure the disk is initialized to zeros. In step 840, the rank manager logically adds the disk as a new data disk (initialized to zeros) at the end of the stripes in the rank, thereby lengthening the stripes. In step 850, the rank manager informs the system of the new stripe lengths. In step 860, the system updates the stripe allocation information. And in step 870, the system uses the longer stripes in future write operations.

FIG. 9 illustrates a method 900 that the system and rank manager may use to replace a failed disk. In step 910, the rank manager has detected a failed disk and reconfigured itself according to method 700 of FIG. 7. In step 920, the system views the reconfigured rank as a new rank that is smaller (e.g., in stripe size) than the old rank. In step 930, the failed drive is removed from the rank. In step 940, a new drive is inserted. Steps 930 and 940 may be performed manually by a technician. Finally, in step 950, the system performs a drive upgrade process according to method 800 of FIG. 8.

B. Arrays of Ranks

In the preferred embodiment, the storage system 600 has three or more ranks 610 in it. Ranks can be added and removed during operation.

A given location in the storage system can be uniquely described by a rank number, a stripe number, an offset within the stripe and a length. Offsets and lengths are always in granules.

C. Writing to the Array

Stripes 620 are the write unit used in the storage system 600. In the preferred embodiment, nothing less than a stripe is written in system 600. Each stripe 620 contains internal metadata which guarantees that the stripe is valid. Preferably, the header for a stripe contains its stripe number, its size, generation number, successor and predecessor (see below) and a checksum or other way to verify that all writes took place to all disks within the stripe.

Figure 10:
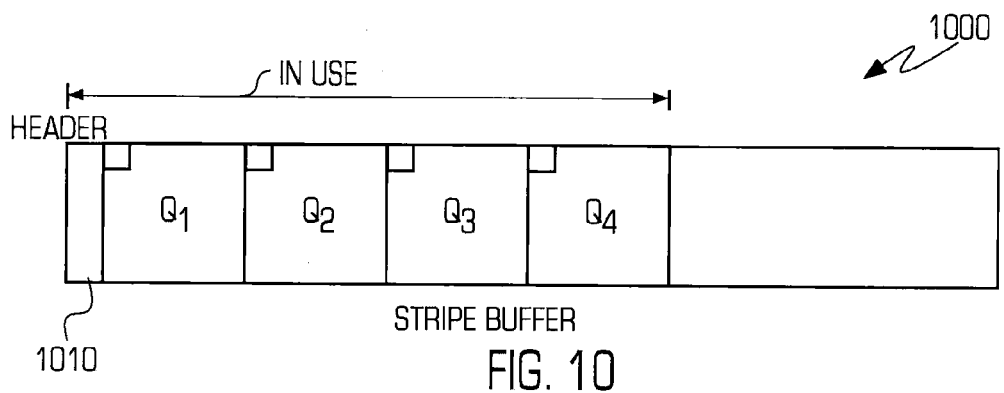
FIG. 10 is a conceptual view of a stripe buffer.

The system may contain a non-volatile stripe buffer which is comfortably larger than the largest stripe. FIG. 10 is a conceptual view of a stripe buffer 1000. The stripe buffer 100 may be initialized with a stripe header 1010 before objects are written to it. Objects 1020 (e.g., objects $Q_1$-$Q_4$) are appended to the stripe buffer until an append fails due to lack of size. Then the stripe is committed back to the rank atomically and the unwritten object goes into the next stripe. The unused space at the end of the stripe is recorded in the stripe space table.

The actual order of objects within a stripe may be subject to certain policy-based manipulation. In other words, objects do not need to be written on a first come, first served (FCFS) basis (although in certain embodiments, they may). There may be various types of different priorities for writes. Some writes may be committed synchronously and others may be written, "when the system gets around to it." (The concept of write ordering is one that has resulted in software which is highly opinionated about when a write needs to take place.) When there is a large queue of objects to be written, the system can choose the order in which these objects are placed into the stripe buffer and ultimately committed to disk. For example, the system can operate as described below to provide the following number of interesting tradeoffs:

Shorter time to disk—High priority blocks can be put into the stripe and the stripe can then be committed immediately—even at the cost of some vacant space.

More efficient disk usage—Low priority blocks can be committed in any order such that the stripe storage is used more efficiently. (This may be a variation on the well known "knapsack problem.")

Write suppression—if the same object is in the write queue several times, it may be possible to eliminate some or all of the write instances.

Alignment—performance will suffer if an object spans more than one disk. The system may choose to insert objects in such a way as to guarantee that one or more objects do not cross the end-of-disk boundary. This may involve inserting "dummy" objects as fill.

In one embodiment, the system includes multiple stripe buffers that can handle multiple, independent threads of writes concurrently. By using multiple stripe buffers, the write data can be physically adjacent when written. This is a major advantage for multimedia/streaming applications. It can also improve cache and recovery times for some database and file system applications.

(An important correlated issue is discussed below. Using opportunistic copy forward, it may be possible to magnify the available pool of writeable objects dramatically which can ease the above selections somewhat.)

Objects may be written preceded by a header. This header preferably includes the object's OID, generation (or version number) and stored length. Objects may be stored in compressed form, but the header is typically not compressed. Objects are typically stored padded to granule size (probably 16 bytes or so). This allows objects to be different sizes without any additional complexity. Although some embodiments discussed herein assume that objects can be up to 64K in size, the actual optimal value may be larger, or even smaller depending upon the hardware.

D. Stripe Space Table

Figure 11:
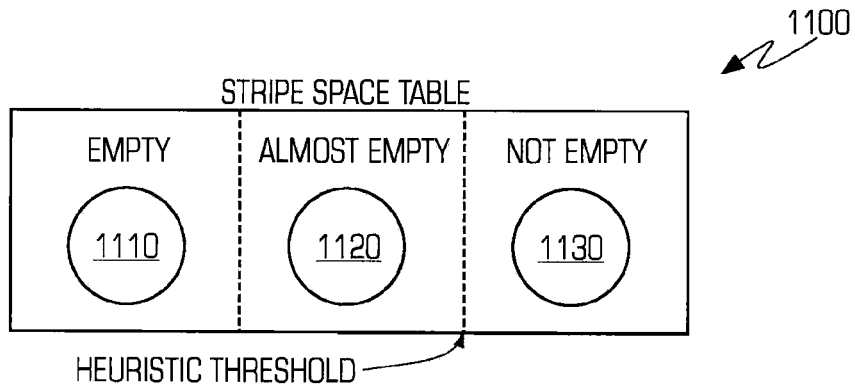
FIG. 11 is a conceptual view of an embodiment of a stripe space table.

The stripe space table contains an entry for each stripe in the system. FIG. 11 is a conceptual view of an embodiment of a stripe space table 1100. Stripes are kept in one of three states: empty 1110—no space in use at all, nearly empty 1120—some space in use, but less than <threshold> space in use, or not empty 1130—more than <threshold> space in use. Space is once again tracked in granules. Headers are not considered when considering space in use. The threshold value between nearly empty 1120 and not empty 1130 may vary based upon heuristic parameters discussed below and changes during execution.

When the system needs to allocate a new stripe, the stripe space table 1100 is consulted and an empty stripe is selected. An algorithm may be provided for deciding which stripe to select based on desired performance characteristics, and be tunable to allow load sharing across many ranks and take into account a wide range of factors.

Eventually, the empty stripe pool will shrink below a threshold. (This is in the case of heavy write traffic where natural obsolescence and opportunistic copy forward is not able to supply the system's needs automatically.) At that point, the system uses a copy forward operation to convert nearly empty stripes into empty stripes. If, in extreme situations, the nearly empty stripes pool 1120 becomes empty, the not empty stripes pool 1130 is searched for the most nearly empty entries and the threshold between the nearly empty and not empty pools is adjusted as required. Conversely, if the nearly empty pool 1120 becomes overly full, the threshold can be adjusted upward.

As objects are made obsolete, space is freed within the stripe where the object instance is stored. As this occurs, the stripe is located in the stripe space table and its free space amount is incremented by the size of the object instance. This causes objects to migrate toward the empty state through normal operation.

In order to provide for recovery for disk failures, the total space available in the system should be somewhat greater than the size of the largest rank. This feature is discussed below in greater detail.

There are a number of stripe allocation policies and concepts that may be implemented in operation. At times, the majority of the empty stripes will be associated with one rank (perhaps newly added). (One potential solution to the "new rank" problem would be to restrict the rate at which the stripes in the new rank are added to the pool. This limitation could be on a time basis (n stripes/hour), on a usage basis (every nth stripe allocated) or on an entirely different policy.) At other times, there will be a more evenly divided selection of empty stripes. Large ranks will routinely have more empty stripes than small ranks. Intuitively, this indicates that the priority of a rank in the selection may need to be driven by free stripe percentage or a similar metric. There are many ways to select the next rank for storage. In the preferred embodiment, the system is based upon a priority system which selects stripes based upon multiple criteria. Any suitable method and criteria may be used in the present invention, including the following examples.

FIFO is a simple method that can be used. This method has a number of potential advantages including simplicity and that it will guarantee that each stripe is written approximately the same number of times. One disadvantage of this approach is that it could create "hot spots" whereby the system allocates many stripes (non-contiguously) on the same rank resulting in a significant amount of seek time and a general bottleneck.

(Note: random shuffling of stripes between ranks at system startup could provide a noticeable improvement.)

Random selection is another method that can be used. This will tend to avoid the "hot spot" problem when the available stripes are generally well distributed across ranks. However, it could still generate a lot of otherwise unnecessary seek activity.

Round robin is another method that can be used. Round robin would guarantee that all ranks carry some of the write traffic. However, with large and small ranks in the same system, the small ranks may become full quickly and the large ranks may become the bottleneck again. Some degree of proportionality may make this more reasonable.

One technique which is additive to the above is the use of sorted order within ranks. In this case, the stripes within a rank are kept in a list that is sorted by stripe number. As stripes become free, they are inserted into the list (but the list keeps its order). In one embodiment, allocation is from one end of the list. This has the advantage of keeping the mechanical seek distance minimal while making it trivial to figure out what stripe to allocate next. If all available stripes within a rank are kept in sorted order, the inter-write seek distance would be minimized (effectively using the elevator algorithm for storage allocation). In one embodiment, this is accomplished by maintaining separate tracking of stripe storage for each rank, and making the stripe allocation problem into two steps: (1) decide which rank to use next; and (2) decide which available stripe within the rank to use.

The use of similar approaches in driving the copy forward operation could result in a more reasonable distribution of available stripes. In other words, by noticing the distribution of available stripes in the empty stripe pool, the copy forward mechanism could select nearly empty stripes from the ranks with smaller stripe populations in the empty stripe pool.

One issue concerns the ability to recover from a partial loss or corruption of metadata. In one embodiment, this issue is addressed by storing at the beginning of each stripe a list of the next or previous (or both) stripes—a predetermined number (e.g., 50 in each direction). If the allocation system guarantees that a given rank will supply at least one in 50 stripes, then it will be possible to recover the write order for stripes from scanning any one rank in stripe order.

E. Object Map

Figure 12:
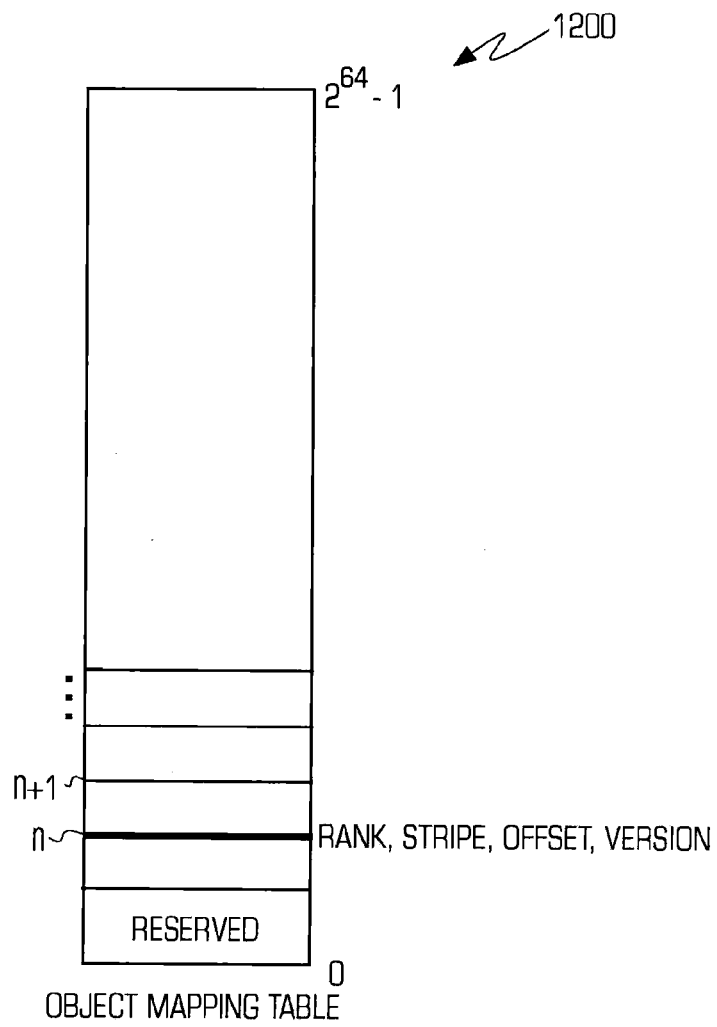
FIG. 12 is a conceptual view of a stripe buffer.

Each object in the storage system is given a unique object identifier (identification number) or OID. These numbers along with the location (e.g., rank, stripe and offset values), length and version of the object can be stored in an object mapping table. FIG. 12 is a conceptual view of one embodiment of an object mapping table 1200. The first object created in the system is numbered n and the next is numbered n+1 and so on. (The first OID values are reserved. OID 0 is defined to mean a pointer to no object or the null object. Other reserved OID values may be used for various other reasons such as creating objects with read-only content such as all 0s for space savings with some classes of applications such as read-only DVD emulation.) The size of the OID is large enough so that values will not overflow or "wrap around" in the life of the system. In one embodiment the OID may be 64 bits. Other embodiments may use larger or smaller OIDs. Objects are also given a generation number, which in one embodiment may be a 16-bit number. The object map translates an OID (and an optional generation number) into a disk address (rank, stripe, offset and length). Objects which have changed several times may have more than one address, one for each generation still valid in the system. Furthermore, object instances which are invalid may still exist in the system since copy forward is not an instantaneous process.

The system may periodically prune the object map to remove obsolete object instances. For example, if the system is to keep eight versions of a given object and the object map contains ten, the pruning process would remove the proper two versions (presumably the oldest, but not necessarily depending upon the retention policy for the object), update the stripe space table for each effected stripe and then return any freed memory to the system.

In one embodiment, the object map can be viewed as a classic multilist or list of lists. The first list is indexed by OID. For each OID, a second list is provided which is indexed by generation. By definition, all lists are sparse since ultimately all instances of an object may become obsolete which will result in the system deleting all references to the object.

The generation number may be divided into major and minor generations or some other system to indicate the difference between a stable or "golden" version of an object and an intermediate version. For example, if policy requires that the system keep eight recent checkpoints of an object, once per hour, the object map would need a reference to eight older object instances plus potentially all new instances of the object. At some point in the future, a new snapshot would occur which would make the then-current instance into a golden version; delete all intermediate versions and the oldest golden version.

OIDs can be allocated yet not have a corresponding value on disk. OIDs which do not exist in the table (but have been allocated) will be assumed to have a default value pointing to no object. In other words, the object space can be sparse. (This makes allocation of large blocks of sequential OIDs practical. The OID range can be filled in as demand fills it.) The system builds entries in a "lazy" manner, i.e., upon access, not allocation.

Furthermore, OIDs cease to exist once there is no longer a valid instance. The object map therefore is of large but finite size at any point in time. Since there is a very large space for OIDs, they can be allocated at will and discarded without penalty.

This philosophy results in an effectively sparse object map in memory. Any suitable data structure can be used, such as a hash or tree structure (or some derivative there from).

Standard Write Operation

Figure 13:
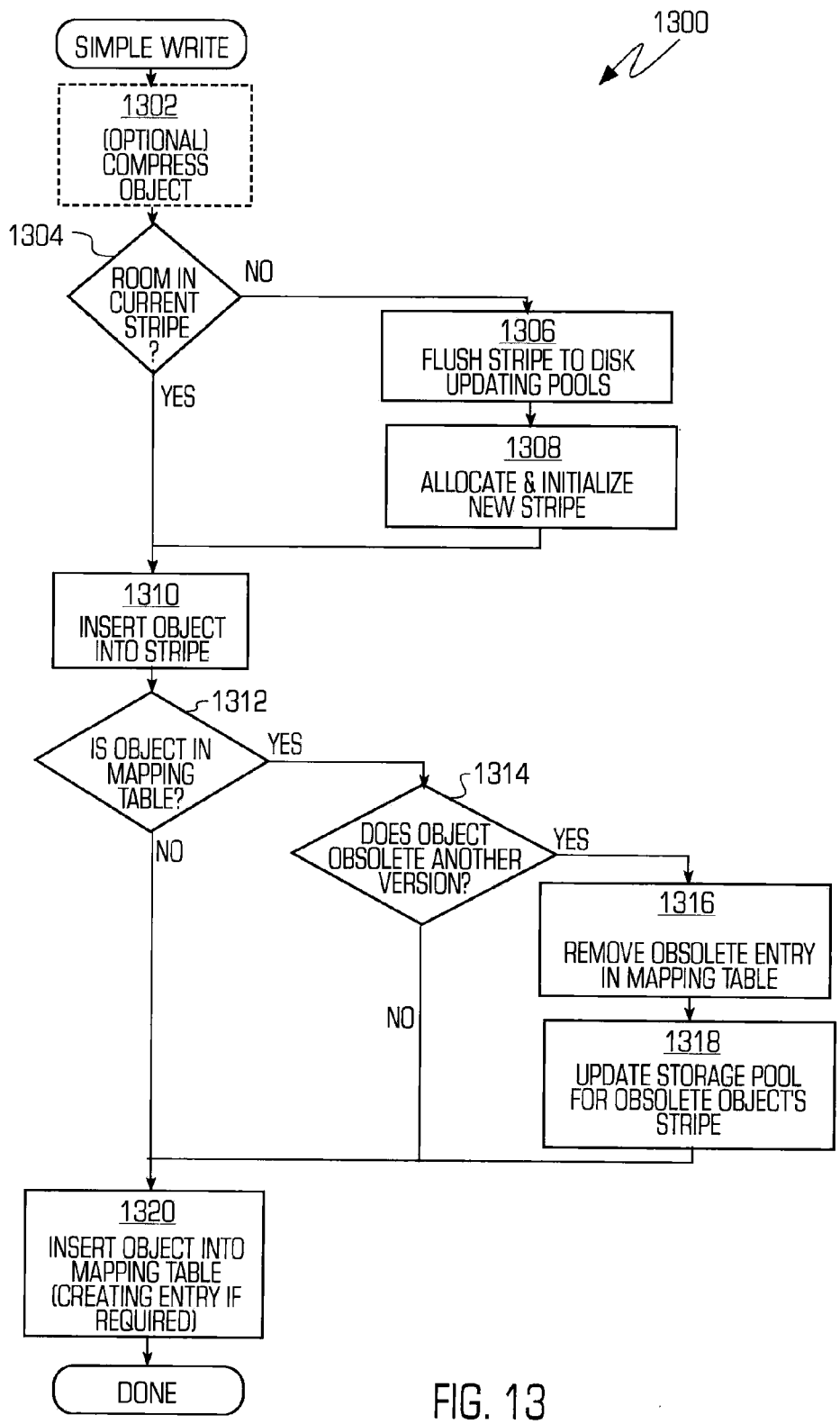
FIG. 13 is a flow chart illustrating the methodology of a standard write operation in the file system.

FIG. 13 is a flow chart illustrating the methodology 1300 of a standard write operation in the file system. In step 1302, the system may compress the object to be written using a conventional compression algorithm. In step 1304, the system determines whether there is sufficient room in the current stripe to fit the new object. If sufficient room is not available, the system removes the stripe from the stripe buffer and assigns the stripe to the appropriate pool (e.g., not empty), in step 1306. Next the system allocates and initializes a new stripe, in step 1308. In step 1310, the system inserts a new object into the stripe. In step 1312, the system determines whether the object has been identified in the object mapping table. If it has, the system determines whether the object would render another version of the object obsolete, in step 1314. If so, the system may remove the object version of the object from the mapping table, in step 1316. Next, in step 1318, the obsolete object is removed from its stripe and the stripe's available storage is updated (e.g., the stripe might move from not empty to almost empty). In step 1320, the system adds the object to the mapping table and creates an entry for the object if required, e.g., describing the location and version of the object.

Copy Forward Operation

The files system provides a copy forward operation. One key design feature of this system is that once data is written, it is never modified in place. Instead a new object instance is created and stored in a new stripe. As new instances are created, older instances can (but are not required to) become obsolete. From time to time objects are deleted which obsoletes them. Either way, stripes which once were full or nearly full of valid objects begin to include regions of free space. The stripe space table keeps track of the total amount of available space in a stripe and enables the system to reuse a stripe once all objects are obsolete.

However, a number of situations can occur which will cause the system to consolidate objects to free up stripes. One example would be in the case of the need to remove a rank from the system. Another would be if a large number of new objects were created which consumed a large fraction of the available empty stripes.

The act of consolidation is called copy forward. It operates as follows. The system selects a candidate stripe (typically one with only a small amount of valid data), reads in the valid object(s) and stores it as if it were a fresh write with the exception that its generation does not change. The object map is updated to point to the new location for the object. Once all valid objects have been relocated, the stripe is now empty.

In greater detail, one implementation technique would be to read in the stripe, go through the stripe object by object and determine whether the indicated object was still valid. The object could then be queued to be written.

FIG. 14 illustrates an exemplary method 1400 that the system may use to implement a copy forward procedure for a single stripe 's'. In step 1402, the system fetches contents of the stripe. This may involve using redundant information to recover the entire stripe (e.g., in the presence of a disk failure). In step 1404, the system begins looping through the entire stripe selecting and moving each object until no more space is in use in the stripe. In step 1406, the system determines whether the object is in the object map. If the object selected is not in the object map it may be deleted. If the object is in the object map, the system determines whether the object is valid in step 1408. If the object is not valid, the object may be deleted. Otherwise, the object is copied into a new stripe, as shown in step 1410. In step 1412, the space in use in the stripe is reduced and the resulting space is recorded in the stripe space table. The loop ends in step 1414 after the system checks all objects in the stripe.

One option that can be deployed during any copy forward operation is incremental compression. Normally, if an object survives long enough to need copy forward, it can be viewed as essentially read-only. This means that while the object may be available for update, it has seldom been updated. (However, at this level the system might not "know" how popular the object has been from a read standpoint. It may be useful to track this information in some embodiments.) As such, high compute-expense operations such as some forms of compression may be useful since the space savings could be substantial. Therefore, the system may apply conventional compression techniques to compress a large number of objects, in order to achieve a dramatic reduction in the total required space for a file system or volume. (The system does not consume space for missing objects creating a naturally sparse environment to begin with. In block storage applications, this can reduce storage requirements by up to a factor of 5 by itself. Compression can reduce the remaining storage use by a factor of 3 or more. However, these savings are highly data/application dependent.)

Since the system does not care what the size of an object is when it is stored, the object can be compressed (which changes its size). Therefore, the present invention can use any conventional compression algorithm. For instance, one way would be to take the payload of an object (e.g., everything but the metadata header) and compress it using a standard algorithm. Large objects will likely compress better than small ones, but some objects will be filled with 0's and compress very well no matter how the compression is performed.

Opportunistic Copy Forward Operation

The file system further provides an opportunistic copy forward operation. There may be times when write traffic is insufficient to guarantee that write requests will fill up a stripe buffer quickly enough for performance needs or software expectations. In this case, the stripe buffer can be committed before it is full. The entry in the space table will cause the stripe to undergo copy forward somewhat earlier than would have been the case.

This may be performed more efficiently. In one embodiment, the system keeps a buffer of objects from stripes which are the next candidates for copy forward. This allows the stripe buffer to be filled with these objects whenever required. In essence, this opportunistic strategy can be used to fill any stripe at any time. As a side effect, the need any demand-driven copy forward will be reduced and the number of free stripes will be kept near maximum. This technique can also be run whenever the array is idle.

Normal configurations will have huge amounts of untapped read and write bandwidth. In principle, opportunistic copy forward can take place continuously without serious user visible impact.

Bulk Copy Forward Operation

A version of the copy forward operation called bulk copy forward takes advantage of the geometry of a rank to visit each stripe in order for maximum throughput. This technique is used to evacuate data from a rank in minimum time and with maximum efficiency. Bulk copy forward might not be a common activity, but performance during it may be important, such that it may be valuable to optimize the system with this feature in mind. In a system with three ranks, evacuating a rank involves reading stripes sequentially from the source rank and spreading the writes across the two remaining ranks (e.g., concurrently writing to the two remaining ranks). In principle, there will be about 2× the write bandwidth required for the task (depending upon the specifications of the various ranks involved). Since there will be fewer bytes written than read, the result should be that well less than 50% of the system's overall write bandwidth is consumed—allowing continued operation with the remaining bandwidth (which should be several times the required bandwidth).

Figure 16A:
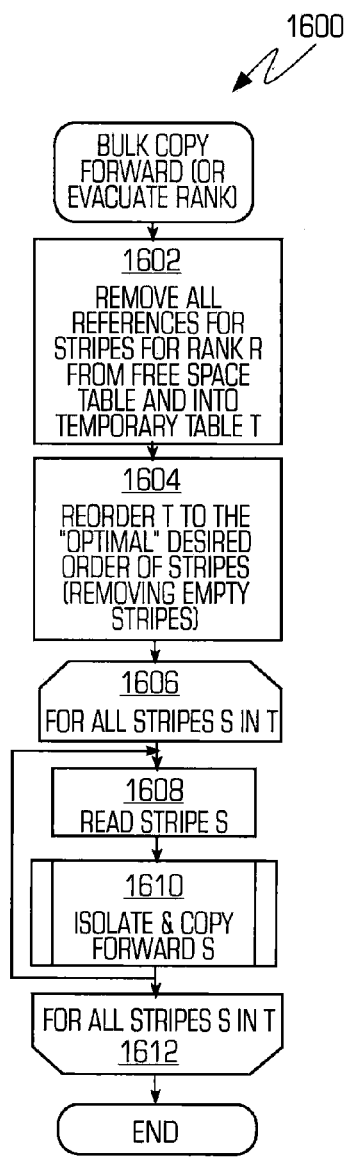
FIGS. 16A and 16B illustrate two methods of performing a bulk copy forward operation.
Figure 16B:
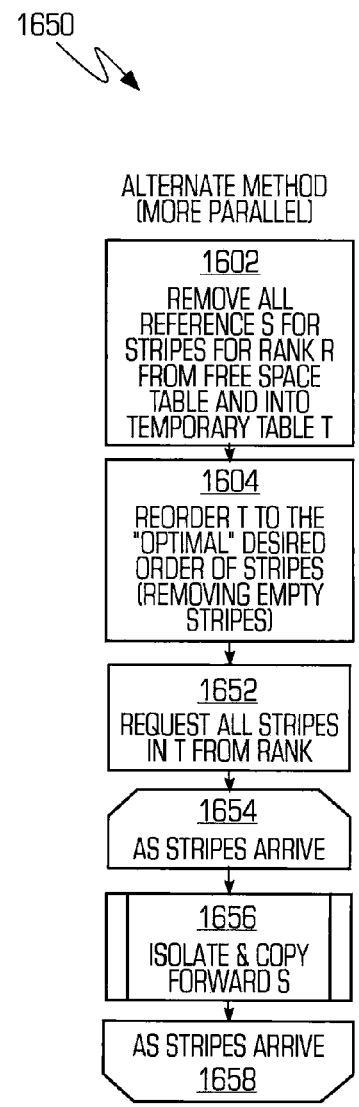

FIGS. 16A and 16B illustrate two methods of performing a bulk copy forward operation. The method 1600, shown in FIG. 16A, begins by removing all references for stripes for a rank "R" from the stripe space table, and moves the stripes into a temporary table "T", as shown in step 1602. This has the effect of guaranteeing that no additional writes will take place in rank "R". In step 1604, the system reorders the temporary table "T" based on desired parameters and removes empty stripes. For instance, the result of the ordering could be to minimize transfer time, optimize seek times or meet any other operational priorities at the time. Then, for each stripe "S" located in table "T", the system reads the stripe, isolates the stripe and performs a copy forward operation on the stripe, as shown by steps 1606-1612. Once all stripes have been copied forward, the routine ends.

The method 1650, shown in FIG. 16B, begins by performing steps 1602 and 1604 of method 1600. However, after step 1604, the system requests all stripes from table T concurrently. As each stripe in table T arrives the system isolates the stripe and copies it forward, as shown in steps 1654-1658.

F. Volume Index

Emulation of a virtual disk with standard block-level services is straightforward using the present system and a volume index. The volume index's purpose is to translate regions of storage (logical disk addresses) into OIDs. (Some additional generation/version/timestamp may be required for some types of functionality.) FIG. 15 illustrates one example of a volume 1500 index that may be used with the present invention. The volume index may be large and may need to be paged. However, it is expected that the volume index will be memory resident. One potential "trick" would be to create a sequential block of OIDs for the size of a volume. This would enable the table to be reduced to a few lines of code and almost no memory. Expansion of the volume could be performed by either reissuing the OIDs (issuing a new block of OIDs and then changing the object map) or by issuing a second block of OIDs for the increment and keeping a record of the exception. Either solution could be quite memory efficient, CPU efficient and easy to implement.

The process for creating a new volume requires the specification of a number of parameters. One is the size of the volume (however, this can be changed in the future). Another is the blocking factor for the volume—the number of sectors to place in each object. Options include encryption and compression along with a variable number of versions (and associated higher level versioning policies). Another is the mechanism for handling intra-object storage. In the simplest case, the object will contain an image of the simulated disk's sectors in the corresponding virtual disk address range. However, due to the popularity of smaller writes and partial writes considered with the efficiency of compression growing as the object to be compressed increases (within some limits), a more sophisticated internal object format may need to be considered for some applications.

For example, if the largest object size of 64K is selected for the blocking factor and the SVFS is being used on top of the volume, a large amount of pre-reading and updating might be required, which would generate a huge amount of disk traffic. If compression were enabled, the 64K object would require compression for each 1K write. The overhead of this approach could be undesirable.

However, the above example could change dramatically if the blocking factor was reduced to 1K. This opportunity for tuning could be quite powerful when matching the parameters of the simulated disk to the requirements of the higher level software. A "tree structure" blocking system may be used whereby the actual object sizes are closely tied to the sizes of reads and writes. Many file systems will generate different sized writes in different parts of the disk. This could be captured passively and used to optimize the blocking on an object-by-object basis. The result would include a dramatic reduction in blocking/deblocking activity and its associated pre-fetches and the like.

When being accessed by a host, requests for a given logical disk address are translated into an OID, and then the OID is used to access the object map which provides the actual disk location of the data. Since the two maps are assumed to be in memory, the translation process will be very fast compared with the disk access.

As new versions of a sector are written, the object map is updated with the new addresses. It is possible to revert to any previous version of the volume by using earlier generations in the object map. Furthermore, it is possible to use previous versions as "read-only" checkpoints of the volume for backup or other purposes. It may be possible under certain circumstances for fsck and similar programs to be modified to consider the current and previous versions of a given object/sector so that the system can recover a more useful state of the file system (or volume) after a crash. Fsck is a program which processes the contents of a file system validating the structure of the file system and under certain circumstances modifying the structure to make it 'legal' again—typically after a crash which leaves the on-disk image of the file system somewhat scrambled. Fsck has intimate knowledge of the internal structure of the associated file system—in fact, there are different versions of fsck for different types of file systems and the source code for fsck is typically maintained by the file system engineers. When it is run, Fsck builds up its own picture of the use of all storage in the file system. In essence, all storage falls into one of several categories: data, metadata and free. In one embodiment, the storage system uses a straightforward modification of Fsck that informs storage system as to which portions of the volume are truly free (e.g., contain no valuable data or metadata). This makes it possible for the storage system to obsolete any objects which currently contained values for freed space.

An example of this situation would be if a user created a large file with a multi-megabyte JPEG picture in it. The file system would allocate blocks as required to hold the picture and metadata blocks to reference the data blocks. The storage system would see this as a series of write operations to various portions of the logical volume—but would have no "higher knowledge" about the contents or operation. If the user then deleted the file, the file system would update its metadata (which the storage system would see as some series of writes to various portions of the logical volume). However, while the file system would now "know" that the blocks once associated with the JPEG image are now free, the storage system has no such knowledge and in fact will faithfully continue to maintain the images of the blocks even though they are now 'deleted' at the file system level. The modified version of Fsck would inform the storage system that the blocks in question are no longer allocated so that the storage system could free the objects and associated space.

It is possible to create as many emulated disks as desired. There is no pre-allocation of space so the overall storage requirements can grow and shrink with need. In fact, additional storage can be added transparently and trivially without application-visible changes. All emulated disks pull from the same storage pool spread across all ranks. Users may choose to limit the ranks upon which a volume may reside, but the expectation is that all volumes will be spread across all ranks. This similarly applies to the file systems below.

Space consumption of the volume is interesting and unique. The act of creating a volume (allocating lots of OIDs) does not result in the allocation of any disk storage. Storage is allocated as a function of writes to the volume. For common operations such as creating a new file system on top of a volume (for example, running the newfs(1) command on a UNIX host against a simulated disk volume) will generate a shower of writes, but the total space consumed will be only a small fraction of the total size of the volume. Space will be consumed as files are written to the volume. However, as files are deleted and created, the system will tend to reuse the same regions of disk which will help limit storage growth. It should be appreciated, however, that once the file system writes to a sector, there would be an underlying object in the system. With current host-based file systems (not the integrated file system described below) the only way to recover space is to delete the file system and rebuild it.

It would be relatively simple to modify client file systems so that they actually issued a delete operation. The issue here is that the system might not be able to tell whether a given object (logical collection of sectors) is currently being used by the client file system or if it is now "free space", which has previously been used but is no longer necessary. In one embodiment of the present invention, a simple modification to the storage management portion of the client file system informs the object management system when a given object no longer contains real data (e.g., when the object becomes obsolete). Then the object can become zero length. In order to boost the market acceptance of the present file system dramatically, this functionality could be added to some open source file systems and the code released. A second way to optimize this would be to replace the entire storage management portion of the client file system with an object-aware system which would allocate and deallocate objects as required.

The system may also include a utility which has special knowledge of the layout of a file system such that it could compare the object allocation with the unallocated space in the file system. The utility simply traverses the data structures of the client file system (with special knowledge of the structure of the file system) and determines which objects are in use and which ones are now "free space." The utility then "prunes" or removes the unused space from deleted files. A similar program could be written for all types of block volume consuming software such as Oracle™.

G. I-Node Format

Emulation of a standard file system with standardized file functionality is simple using this storage system. Instead of using the volume index (which is required for block-level services), individual collections of objects may be brought together to form file systems using a structure called an i-node (which is similar but not identical to the UNIX i-node). When creating an emulated file system, a number of parameters may be set including the versioning policy and parameters, whether to use compression and/or encryption, or the like. (Many of these options could be set on a file-by-file or directory-by-directory basis just as well. In fact, there is no reason why these decisions could not be implemented on an object-by-object basis if desired.)

An i-node contains any semantically important metadata plus all metadata required to access any portion of the file at any time. There are four formats of i-nodes (though more could be defined in the future)

1. I-Node Type 'A' or Immediate I-Node

Figure 17:
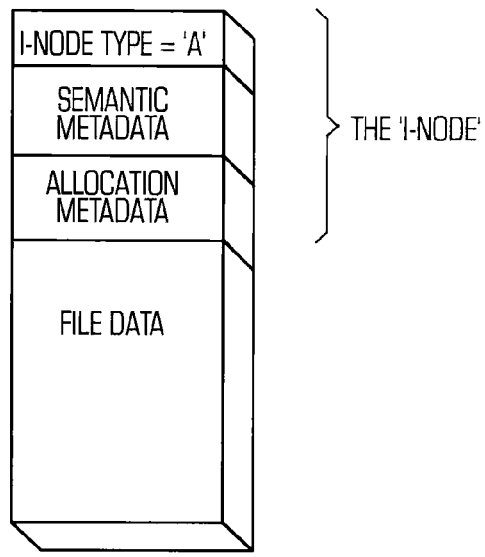
FIG. 17 is a block diagram illustrating an I-node type "A", according to the present invention.

This is the simplest and most space-efficient storage. It will be used with small files and most directories. FIG. 17 illustrates the contents of an I-node type "A" on-disk object. As shown the I-node type "A" object includes "semantic" metadata (i.e., metadata that describes contextually relevant or domain-specific information about file content (in the right context) based on an industry-specific or enterprise-specific custom metadata model or ontology), allocation metadata (i.e., metadata specifying the length of the file data, along with any storage options such as compression or encryption), and the file data.

Some advantages of this i-node arrangement are:
  Space efficiency—no space wasted on extra objects, easy storage for small files (such as symbolic links)
  Simplicity
  Low overhead One limitation is the maximum object size. Once a file out grows this i-node style, it moves to a type 'B' i-node. The anticipated maximum object size is in the 64K range so this i-node type will likely suffice for the majority of files and almost all directories on the average UNIX/Linux system. The fraction will be higher if compression is enabled.

A second, minor limitation is that it is not possible to have a sparse file using this i-node strategy. Instead, zero-filled regions will have to be inserted into the object. (Compression will eliminate most lost space which results.) This is not really a problem since with traditional block-oriented file systems, sparse regions seldom completely match blocks. Under UNIX, sparse regions are defined to read as 0's so when writing a small record into a large block in a previously void region of the file, UNIX simply fills the remainder of the block with 0s. The result is clean and indistinguishable from missing or void space. The same technique can be implemented here.

2. I-Node Type 'B' or Direct I-Node

Figure 18:
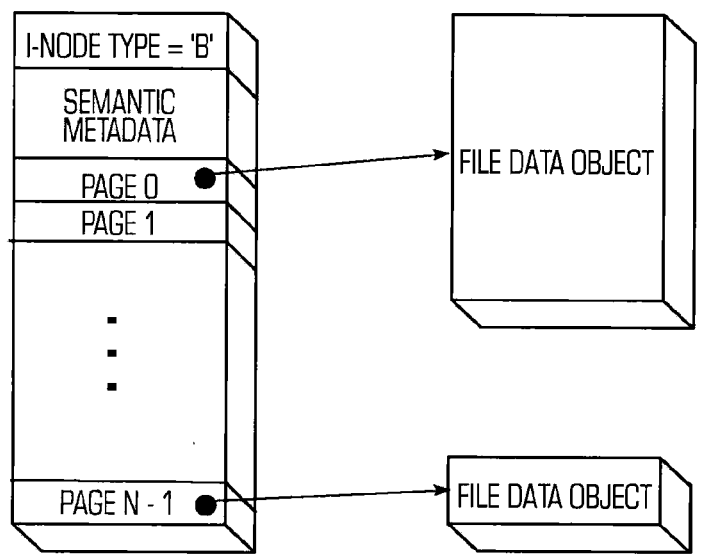
FIG. 18 is a block diagram illustrating an I-node type "B", according to the present invention.

The present invention may also include a type "B" i-node that is somewhat more complex than the type "A" i-node and uses a bit more storage, but allows much larger files. FIG. 18 illustrates a type "B" i-node. The type "B" i-node includes semantic metadata similar to the type "A" object.

In the type "B" i-node, the allocation metadata contains a table of pointers to file objects. These pointer records include offset (mod allocation unit size) and OID. Assuming an i-node size of about 64K and a pointer record size of 16 bytes, a type 'B' i-node can address about 4K blocks of about 64K for a maximum file size of $2^{(12+16)}=2^{28}=256$ megabytes. (Note: eliminating the offset and other efficiencies could reduce the pointer size to 8 bytes which would double this capacity to 512 megabytes.)

Given normal distributions of files in the modern world, relatively few files would out grow this type of i-node.

In the preferred embodiment, when a file outgrows a type A or immediate I-node, the system automatically reserves a block of n sequential OIDs for the data, and then copies the data from the old i-node into the first OID. This would leave the other OIDs allocated but empty. As a result, the act of choosing the proper OID for a given file offset suddenly becomes one of simple mathematics. The idea here is that OIDs are free so the system can allocate 100 sequential OIDs as easily as a single one. If the system "knows" a file will soon need 100 OIDs to store the data, then it can allocate them all at once. Thus, it does not have to "remember" all 100 OIDs, just that the first one is X and that it has the next 99 of them. Furthermore, if the system wants to access something in the third object, then it just takes X, adds 2 to it (to get the proper OID) and then fetches the object to find the proper data. This also makes a type B i-node capable of managing a file of huge proportions.

A variation on the above scheme would be to allocate "chunks of OIDs" (say 1024 at a time) and store the starting OID in the i-node. Allocations past the first chunk of OIDs would create a new entry in the i-node table. A 128 bit (16 byte) entry in the i-node would allow approximately $2^{12}$ entries. Each entry could manage $2^{16+10}=226=64$ megabytes of storage which means that a single type B i-node could manage $2^{26+12}=2^{38}=256$ gigabytes without additional techniques.

3. I-Node Type 'C' or Continued I-Node

Figure 19:
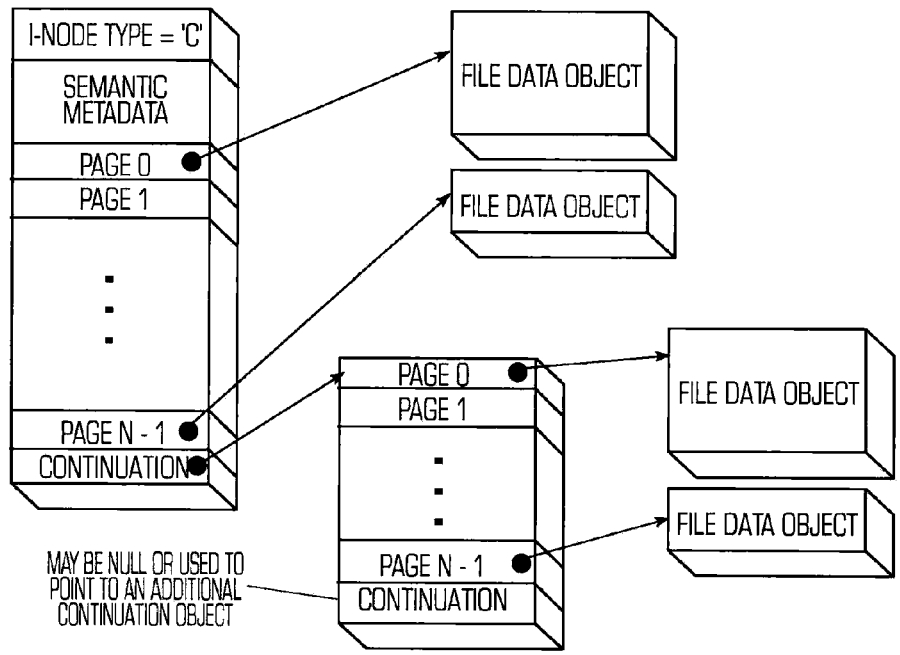
FIG. 19 is a block diagram illustrating an I-node type "C", according to the present invention.

The system may also include an I-node type 'C' or continued i-node. This i-node is a simple extension of type 'B'. FIG. 19 illustrates a type 'C' i-node.

One idea behind the type 'C' i-node is to provide a way to extend the direct or type 'B' i-node with additional pointers. Files which are only somewhat larger than a direct i-node can handle will benefit dramatically from a second object filled with pointers. This approach can be used to extend a file from 256 or 512 megabytes by a factor of 2 to perhaps almost any size. At some point, the overhead of the approach becomes burdensome and a type 'D' i-node is preferred. (Note: the effort required to transform a type 'C' i-node into a type 'D' i-node is very small and the vice-versa is also true.) The above "chunk of OIDs" approach described above could also be applied here for even larger files.

4. I-Node Type 'D' or Indirect I-Node

Figure 20:
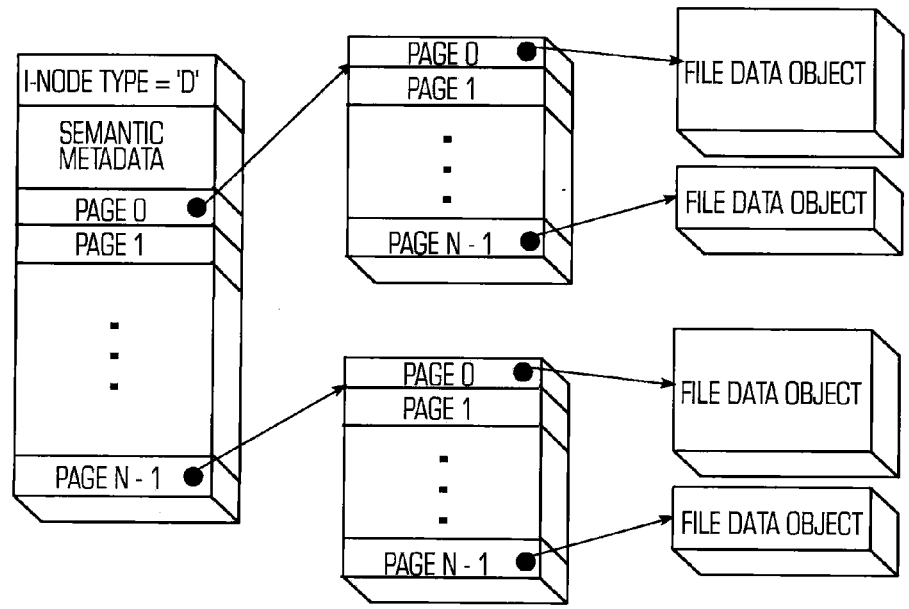
FIG. 20 is a block diagram illustrating an I-node type "D", according to the present invention.

The system may also include an I-node type 'D' or indirect i-node. This i-node represents a more efficient way to handle large files. FIG. 20 illustrates a type 'D' i-node, showing the subtle differences from type 'C'.

Here, instead of lengthening the direct page list as in the continued i-node, a two level index is provided. The i-node contains pointers to direct pages. This approach should be sufficient to address files on the order of $2^{(13+13+16)}=2^{42}=4$ terabytes.

It is possible to implement a continued indirect i-node which would provide a similar extension to the high-level index. If required, an additional i-node style using 2 levels of indirection could be implemented. Such a scheme would allow files on the order of $2^{(13+13+13+16)}=2^{55}=32$ petabytes.

Similarly, the 'chunk of OIDs' trick could be used to increase the size of file handled from 256 gigabytes to an exabyte or more. The system could also include a specification on the number of OID's in a chunk, extending the size of the pointer record to a predetermined size (e.g., 20 bytes, allowing up to $2^{32}$ OIDs in a chunk). This would allow the system to handle extremely large files.

H. Directory Organization

In one embodiment, directory organization of the file system uses a standard file scheme with i-node. However, this scheme may be less desirable for larger directories due to the implicit linear search to find a given file.

In another embodiment, the file system implements a more powerful approach that utilizes a hierarchy of objects to implement a balanced tree (b-tree derivative) structure. This approach has the advantage of keeping all entries in order and searchable in log time. The tree structure would be implemented by using separate objects for each node of the tree.

In another embodiment, the file system implements an extendible hashing method, which makes it possible to have a very fast lookup of a given file in a directory and scales well with large directories. The hashing would use other objects to store the buckets.

IV. Other Operational Functions

A. Adding a Single Disk Toa Rank

In a RAID 4 or 5 configuration, adding a data disk initialized so that every sector is all 0's will not change the parity. Thus, in embodiments using a RAID 4 style arrangement (with separate "parity" disks), one can introduce new data disks which are initialized to 0 without modifying ANY of the parity data. This is independent of m and n. Thus, by using the stripe/offset style of addressing of the present invention, no data rearrangement is required. Instead, the stripes simply become longer. (This same technique can be used with RAID 0.)

Thus, adding a disk to a rank is very simple in the storage system of the present invention and can be performed during operation without bringing the system down. When a new disk is inserted, it must then be initialized to all zeros (or initialized for addition to the stripe without redundancy changes). (It can stay in this state as a spare in the system for an indefinite period.) It is then enabled by a two-step process. The first step is to logically append it to the stripes for this rank—making the stripes longer by a geometrically-related amount. The second step is to revisit the stripe space table enlarging all stripes in this rank by the suitable amounts. At this point, the storage is in the system and will be used without further intervention.

B. Adding a Rank

Adding a rank in the file system of the present invention simply requires enlarging the stripe space table with the empty stripes in the new rank. The system will automatically begin to use the space soon because all of the stripes are shown as empty. In the preferred embodiment, whenever a rank is added to the system, it is given a new rank number. Even if the rank was removed and reinserted without modification, the rank is issued a new rank ID and it is considered to have no valid data.

C. Removing a Rank

Removal of a rank in the file system of the present invention involves "failing" the rank and awaiting the system's recovery. When a rank is "failed," the system immediately removes the rank's stripes from the stripe space table (which guarantees that no new allocations will go to it) and then the system performs a bulk copy forward operation on the array which migrates the valid contents to the remaining ranks. (This is the reason for the operational requirement that free space should always be somewhat more than the size of the largest rank.) Once the bulk copy forward is complete, the rank can be removed—the system has no further connection with it.

D. Error Recovery

Figure 4:
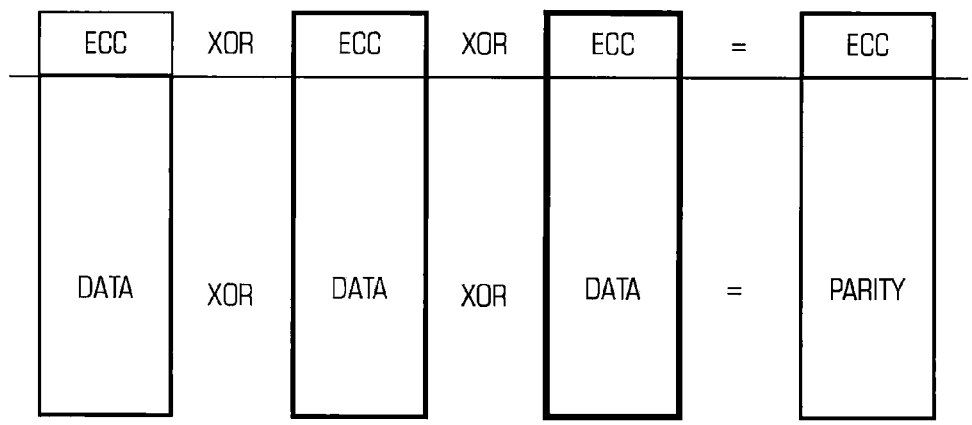
FIG. 4 is a conceptual view of the relationship between the ECC fields in a RAID configuration including a parity disk.

An important feature of parity-based RAIDs (e.g., RAIDS 4 and 5) is that the parity operation is based upon the exclusive OR (XOR) operation which defines a Galois (finite) field. The ECC information which is carried along with the data in each disk sector is also based upon the XOR operation so it too defines a Galois field. This means that if the data field of the parity disk contains XORed contents of the other disks, then the ECC fields for the parity disk contain the XORed values of the ECC fields for the other disk. (This assumes that all disks use the same ECC strategy.) FIG. 4 illustrates this relationship.

This relationship can be used by the present invention to tailor the error recovery characteristics of a given array. For example, if a read returns one sector which is known to be bad (meaning the ECC was unable to recover the entire sector), the parity can be used to isolate the failed bits. In the case of two bad sectors, the parity cannot isolate the bad bits. However, the ECC can indicate the regions in question. If the two regions of error do not overlap completely, it will be possible to use the parity to partially correct one or both sectors. The result could be a reduction in the size of the read error—making it possible to use the ECC to recover the data.

E. Recovering from a Single Disk Failure

The preferred embodiment uses RS-RAID (or some similar technique) to continue to operate in the face of one or more disk failures. However, enough additional failures in a rank will result in the loss of data. It is important to isolate the failed disk(s) and recover the redundant configuration which allows recovery from further failures. The rank may signal the eminent failure of a disk and begin the recovery from it early (this is the preferred approach).

The first thing is that the rank marks itself as "failed." As explained above, this causes all valid data to be evacuated from the rank. Once the rank is empty, it transitions to go off line, and the rank then logically removes the bad disk and reorganizes itself as a RAID 4 (or whatever) with one fewer disk. (In the case of 2 disks, the logical transition is to RAID 1 which is the degenerate case of a RAID 4 (itself a degenerate case of RS-RAID) with only one data disk.)

Alternately, it could enable a spare disk at this time and keep its previous size. The actual reconfiguration is relatively immaterial. (For example, a rank could compensate for too few spindles—and the correspondingly short stripe size—by "doubling up." There would be a performance penalty, but in a reasonably loaded system, performance may be more than adequate. Experimentation is required to determine the optimal policy decisions here.)

Once the rank is reconfigured, it can then add itself back into the system which will cause data to be stored upon it in the normal course of action. At this point, the system can sustain additional disk failures (up to m per rank between reconfigurations) without the fear of loss of data.

F. Volume Roll Back

In the file system of the present invention, rolling a volume back to a previous checkpoint simply involves mapping back each object in the volume to a previous generation.

G. In-Place Upgrade

A common problem in installed systems is that space ultimately becomes scarce and disks grow in size. Yesterday's 9 GB disks, once seemingly huge, are today toys compared with 300 GB monsters (which will themselves appear to be toys in a couple of years). While this technology allows almost unlimited expansion of the number of ranks and the growth of space within ranks, there is another feature which can be even more cost-effective: the ability to swap out smaller/older disks with newer/bigger disks without taking the system down. This saves time, downtime and money—no new cabinets or electronics need be purchased to accomplish this task.

There are two ways to perform in-place upgrades. For slow upgrades (one disk at a time), the preferred method is to select a disk, "fail" the disk, and once the rank has isolated the disk, remove it and replace it with the new disk (which is then brought online). The result is an immediate increase in the available space.

Normally, one will upgrade an entire rank of disks. In this situation, simply "fail" the rank in question which will cause the disks to be emptied of data. Once offline, then the disks can be removed and the new disks inserted. The newly upgraded rank can then go online. Note that there is no requirement that the rank have the same number of disks before and after. For example, an array of 5 9 GB disks (36 GB effective capacity as RAID 4) could be replaced with a pair of 72 GB disks running in RAID 1.

H. Adding Disparate Disks into a Rank

Implicit in the design of a rank is the concept that the rank will have stripes of different sizes due to the geometry of the underlying disks. Introducing a disk with different geometry will simply create more categories of stripe length. The only operational consideration is that the parity region must be as large as the largest portion of the stripe which is stored on any of the component disks. (Note: this implies that in the case of only two disks participating in a stripe that the "parity" is actually a mirror of the other disk's data—which it is by the definition of parity. In other words, in a rank with two large and two small disks, there would be some stripes which had three data disks and one parity disk in a standard RAID 4 configuration. There would also be some stripes which were made up of only two disks and operated in a traditional RAID 1 configuration. Adding another large disk initialized to zero would transform all stripes into a RAID 4 configuration and would not require the regeneration of any parity disk data.)

When adding a smaller disk, some stripes may not include the smaller disk because the smaller disk might not have enough tracks. In this case, these stripes will need to meet the RAID 4 reliability criteria without the disk. (In the extreme case of two disks in the stripe, mirroring—RAID 1—may be used instead.)

When adding a single larger disk, there may be additional tracks. The implementation has several valid choices. In one embodiment, the additional tracks are ignored until such time as there is at least mirroring available. In another embodiment, the system artificially lengthens the "official track length" to reduce the number of logical tracks (at the cost of some performance).

I. Rank Operations

In the preferred embodiment, the system provides the following rank operations:

Read Stripe by stripe number—this operation returns all information in the corresponding stripe. This operation will normally be used when performing copy forwards.

Read Partial Stripe by number, offset and length—This operation is the common way to retrieve an object. The object map contains enough information to translate a request for a given OID into this read operation.

Write Stripe by number—This operation is the normal write method. The rank is expected to provide internal guarantees that all data is properly committed to disk and check on reads that the entire stripe's data is coherent. (This is to avoid the problem where the system crashes after writing all but one disk's data in a stripe. When read, one portion of the stripe will reflect the previous contents of the stripe—disastrous.) One way to implement this is to place a generation number or checksum as the first and last bytes written on each spindle. That way, when the stripe is read, it will be trivial to verify that the first word and last word from each of the disks were identical. If they are not, then the stripe is compromised and some error recovery is required. The header of the disk will indicate the length of the stripe. If a new disk has been added so the physical stripe is much longer than the logical stripe length, then the system can determine that the last disk (with all 0's, not the proper generation or checksum) can be ignored without requiring error recovery.

Initialize Rank—This operation causes the rank to spin up its drives, calculate its stripe sizes and counts, and report the data to the system. This is the command given to a rank to prepare for its first use (or its first use after being reconfigured.)

Startup Rank—This operation causes the rank to spin up its disks and verify that they are ready for operation. In other words, the rank gets ready for work.

Shutdown—This operation turns off the disks and puts the array "to sleep".

Isolate disk and go offline—This operation causes the rank to mark a disk as bad. The rank is offline until an Initialize Rank command is received.

Reconfigure—This operation causes the rank logically to append a spare disk to the data portion of the RS-RAID (already initialized to all zeros) or subtract a disk. The rank returns to the host a table of values corresponding to the stripes in the rank which now have more space along with the amount of space to be added to the stripe.

In the preferred embodiment, ranks also report a variety of conditions to the system. These include:

Disk failing—too many soft errors or other criteria for failure detected. This may be used as a hint to the system to begin isolation procedures to reconfigure the system without the disk.

Disk failed—disk no longer responds properly or succeeds in operations. This could result from too many soft errors or retries. Once a disk is viewed as having failed at this level, the system will use the parity information to recover the data instead of reading from this drive. This forces the system to begin isolation procedures.

Spare Inserted—the rank has noticed a new disk. Once this occurs, the rank may begin to initialize it to all zeros.

This is mostly to inform the operator that the system recognizes that a disk has been added. The system cannot use the disk until it is made ready.

Spare Ready—The rank has completed the initialization of the spare. It is now ready to be added into the system.

V. Features of the Design

The file system of the present invention provides many advantages over prior file systems. For example, the file system has improved reliability, as indicated by the following:

The system can recover from the loss of any disk. It can then isolate the failure and encounter additional failures within the same rank without loss of data. In some cases, it can sustain the loss of ANY three disks (or more) without loss of data or functionality.

The system can recover the state of the volumes (block access), file systems or individual files (file access) at previous specified points in the past.

No fsck operation is required to recover from a crash. Recovery time is small and essentially constant.

The file system is also very flexible, as indicated by the following:

The system can be expanded by a single disk (which may have different geometry than any other disk in the system) without bringing the system down. Similarly, the system can be incrementally upgraded—one disk or a rank at once.

The system can be expanded by ranks while online.

The file system also has improved performance, as indicated by the following:

The system can sustain continuous writes at full rank speed—many times the normal write bandwidth of a RAID configuration. A five-disk rank with modern IDE disks will be able to consume a 1-gigabit FibreChannel at 100% back-to-back writes with extra bandwidth. (Based upon historic compression rates, this figure may double with compression turned on.)

Automatic load leveling—the stripe distribution policy guarantees that all volumes/file systems are spread across all the spindles for maximum concurrency.

The file system also provides the following benefits:

Transparent compression dramatically reduces the amount of storage required for some applications and can double (or more) the effective transfer speed of a rank during reads.

Checkpoints allow access to previous states of the storage (volume or file system) for backup, archive or any other use. Checkpoints consume little additional space under normal circumstances.

Backups can be made in a number of ways from checkpoints. One way is simply to save off the objects (blocks or files) which differ from the previous backup—powerful incremental backup technique. Another way is to copy all objects in a given checkpoint—complete backup.

The system can provide object-level locking which would make it possible to have two or more hosts accessing a volume or file system without unmanaged conflicts. This could boost scalability and create a large shared storage pool.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications. It should be further apparent to those skilled in the art that the various embodiments are not necessarily exclusive, but that features of some embodiments may be combined with features of other embodiments while remaining with the spirit and scope of the invention.

What is claimed is:

1. A storage system comprising:
a file system that uses variable sized objects to store data, the file system being implemented using:
a plurality of ranks, each of the ranks including an array of disks configured to provide a plurality of stripes for storing objects;
a stripe space table that keeps track of space usage in a data storage subsystem;
wherein the file system is adapted to:
write each stripe of data into the plurality of ranks as a unit;
communicatively couple a transaction-logging data storage system to the data storage subsystem;
manage data storage subsystem services to take on the features of a stripe-implemented storage technology;
process mapping information between data object identifiers and physical address information of the variable-sized data objects within the data storage subsystem; and
perform operations among the data storage subsystem, a mapping component and the stripe space table, wherein the operations are coordinated to implement logging variable-sized data objects to be stored and logging changes to stored, variable-sized data objects;
wherein the file system is configured, via utilization of additional metadata and without violating requirement(s) for placing redundant data on a store different than a device for regular data, to write redundant data anywhere on the disk array without restriction of association by allocation rules.

2. The storage system of claim 1 wherein the file system is further adapted to read each stripe of data from the plurality of ranks as a unit.

3. The storage system of claim 1 further comprising:
a stripe buffer for storing objects to be written into a stripe.

4. The storage system of claim 3 wherein the file system appends objects to the stripe buffer until an append fails due to lack of size, and then writes the contents of the stripe buffer into a corresponding stripe.

5. The storage system of claim 4 wherein the file system appends objects to the stripe buffer according to a write ordering policy.

6. The storage system of claim 1 further comprising:
a plurality of stripe buffers for storing objects to be written into stripes, wherein the plurality of stripe buffers allows the file system to concurrently handle multiple independent write operations.

7. The storage system of claim 1 wherein each object is preceded by a header including an object identifier, a generation number, and a stored length of the object.

8. The storage system of claim 1 wherein the file system is adapted to selectively compress the objects.

9. The storage system of claim 1 further comprising:
the stripe space table that contains entries for stripes in the system that are organized based on the amount of free space available in the stripes; and
wherein the file system is adapted to consult the stripe table to allocate new stripes for storage.

10. The storage system of claim 9 wherein the stripe space table includes a pool of empty stripes, a pool of nearly empty stripes and a pool of not empty stripes; and wherein the system first selects from the pool of empty stripes when a new stripe is allocated.

11. The storage system of claim 10 wherein the stripe space table includes a heuristic threshold that separates the pool of nearly empty stripes from the pool of not empty stripes.

12. The storage system of claim 11 wherein the file system is adapted to monitor the pool of empty stripes and to perform a copy forward operation when the pool of empty stripes falls below a predetermined threshold, the copy forward operation being effective to convert nearly empty stripes into empty stripes.

13. The storage system of claim 9 wherein the file system is adapted to monitor when an object becomes obsolete, to free space in a stripe where the obsolete object was stored by deleting the object, and to modify the stripe space table to reflect the free space.

14. The storage system of claim 1 wherein the file system allocates empty stripes for storage using a priority system based on a plurality of predetermined criteria.

15. The storage system of claim 1 wherein the file system allocates empty stripes for storage based on a first in first out method, a random selection method, a round robin method, or a sorted order within ranks method.

16. The storage system of claim 1 further comprising:
an object mapping table that contains an entry for each object in the system indicating a location of the object.

17. The storage system of claim 16 wherein the location of the object includes a rank, stripe and offset of the object.

18. The storage system of claim 17 wherein each entry includes an object identifier, a generation number, and a stored length of the object.

19. The storage system of claim 18 wherein each object includes an object identifier, and wherein the file system further comprises:
a volume index for translating logical regions of storage into object identifiers.

20. The storage system of claim 1 wherein the file system is adapted to create a new instance of an object when data in the object is modified.

* * * * *